United States Patent
Kimura et al.

(10) Patent No.: US 7,792,319 B2
(45) Date of Patent: Sep. 7, 2010

(54) FLAT PANEL SPEAKER, ELECTRONIC DEVICE HAVING SAME, AND STRUCTURE AND METHOD FORD MOUNTING SAME

(75) Inventors: Yuuichirou Kimura, Saitama (JP); Atsushi Yamamoto, Saitama (JP)

(73) Assignee: NEC Corporation, Tokyo (JP)

( * ) Notice: Subject to any disclaimer, the term of this patent is extended or adjusted under 35 U.S.C. 154(b) by 1288 days.

(21) Appl. No.: 11/316,952

(22) Filed: Dec. 27, 2005

(65) Prior Publication Data
US 2006/0140438 A1 Jun. 29, 2006

(30) Foreign Application Priority Data
Dec. 28, 2004 (JP) ............................. 2004-380304

(51) Int. Cl.
H04R 1/00 (2006.01)
H04R 9/06 (2006.01)
H04R 11/02 (2006.01)
(52) U.S. Cl. ........................................ 381/431; 381/423
(58) Field of Classification Search .................. 381/431
See application file for complete search history.

(56) References Cited

U.S. PATENT DOCUMENTS 7,548,766 B2 * 6/2009 Takahata et al. ......... 455/569.1

FOREIGN PATENT DOCUMENTS

| JP | 99393 A | | 1/1997 |
|----|---------|---|--------|
| JP | 1051897 A | | 2/1998 |
| JP | 10051897 A | * | 2/1998 |
| JP | 2002-258249 A | | 9/2002 |
| JP | 200318686 A | | 1/2003 |
| JP | 200323696 A | | 1/2003 |

OTHER PUBLICATIONS

"Nikkei Business", the Nov. 1, 2004, Nikkei Business Publication Inc., p. 90.

* cited by examiner

Primary Examiner—Curtis Kuntz
Assistant Examiner—Matthew Eason
(74) Attorney, Agent, or Firm—Sughrue Mion, PLLC

(57) ABSTRACT

A structure and method for mounting a flat panel speaker are provided which are capable of reliably and accurately positioning a diaphragm in a cabinet and of improving an acoustic characteristic of the flat panel speaker. At least one first protruding portion formed in rectangular portions strikes a first side wall face of a corresponding corner portion of two side walls making up a front case and at least one second protruding portion formed in rectangular portions strikes a second side wall face of a corresponding corner portion of another side wall face of the front case, thus making it possible to properly position the diaphragm relative to the front case and, with the diaphragm being properly positioned, the diaphragm is attached to the front case with the gasket member bonded to the putting-face interposed between the diaphragm and the front case. The diaphragm comes into close contact with the front case in a manner to form a line-like boundary in a contacted portion.

45 Claims, 21 Drawing Sheets

61; Protruding Portion

71; Protruding Portion

FLAT PANEL SPEAKER, ELECTRONIC DEVICE HAVING SAME, AND STRUCTURE AND METHOD FORD MOUNTING SAME

CROSS-REFERENCE TO RELATED APPLICATIONS

The present application claims priority to Japanese Patent Application No. 2004-380304 filed on Dec. 28, 2004, which is hereby incorporated by reference.

BACKGROUND OF THE INVENTION

1. Field of the Invention

The present invention relates to a diaphragm, the flat panel speaker, an electronic device provided with the same flat panel speaker, and a structure and method for mounting the same flat panel speaker, and more particularly to the structure and method for mounting the flat panel speaker employed in the electronic device in which the diaphragm serving also as a screen component is attached to a cabinet including an electronic device such as a foldable-type portable cellular phone using the screen component to protect a display panel as the diaphragm to emit a voice, and to the flat panel speaker used in the above structure and method, the diaphragm making up the flat panel speaker, and the electronic device in which the flat panel speaker is mounted.

2. Description of the Related Art

In recent years, due to high versatility of being usable even during movement of a user or while on a road, a portable electronic device such as a portable cellular phone is now in widespread use. Popularity has been gained by many users to a foldable and freely opening-closing type portable cellular phone, in particular, since the portable cellular phone can be housed in a compact form. Moreover, the foldable portable cellular phone becomes commercially practical which is so configured that, by using a two-axle hinge, one cabinet is allowed to freely rotate relative to another cabinet in a portion surrounding a rotational shaft mounted in a direction perpendicular to a rotational shaft used to open or close the cabinet.

In a portable cellular phone 101, as shown in FIGS. 20 and 21, an upper unit 102 and a lower unit 103 are connected to each other by a two-axle hinge 104 and, on an upper cabinet 105 of the upper unit 102 are mounted a speaker section 106 to output a received voice and a display section 107 made up of a liquid crystal display device and, on a lower cabinet 108 of the lower unit 103 are mounted an operating section 109 made up of various operational keys, a microphone section 110 to receive a transmitting voice, and a voice outputting section 111 having a speaker.

Moreover, the display section 107, as shown in FIG. 22, has a liquid crystal display panel 112 and a backlight device (not shown) to supply illuminating light to the liquid crystal display 112, all of which are held by a holding frame 113 and are housed in the upper cabinet 105. Also, a screen component 114 to protect the liquid crystal display panel 112 is bonded to a front case 115 by using a double-faced adhesive sheet 116.

The portable cellular phone 101 having, in addition to its original telephone conversation function, a data communication function of receiving and transmitting electronic mail and/or of being connected to the Internet to browse home pages is widely used. In the portable cellular phone 101 described above, for example, when a user executes a program downloaded from a site to enjoy a game, in order to hear a voice while viewing a screen of the display section 107, the portable cellular phone 101 is used with its cabinets 105, 108 opened.

However, the conventional portable cellular phone 101 has a problem. That is, when a user views a display screen of the display section 107 in a state in which the portable cellular phone 101 is folded in a compact manner with the display screen faced toward a front, the user cannot hear a voice satisfactorily since the speaker of the voice outputting section 111 hides itself. Moreover, the user, when carrying out a telephone conversation, puts the speaker section 106 on his/her ear with the cabinets 105, 108 being opened, however, since a voice hole of the speaker section 106 is comparatively small, it is difficult for the user to put the voice hole on his/her ear exactly and the portable cellular phone 101 is displaced from a position of the voice hole, as a result, causing an insufficient amount of a voice and an unclear voice. To solve this problem, in recent years, technology is proposed to be applied to a portable cellular phone (as for voice outputting from a display screen, see Non-patent reference 1: "Nikkei Business", the Nov. 1, 2004, Nikkei Business Publication Inc., p. 90) in which, for example, a screen component used to protect a display panel of a personal computer is to be used as a diaphragm.

A flat panel speaker 201 employed in the conventional portable cellular phone 101 is mounted in a cabinet having a display section and, as shown in FIG. 23, is made of a transparent material of, for example, an acrylic resin and includes a diaphragm 202 also serving as a screen component to protect the liquid crystal display panel 112 and an actuator module 203 having a piezo-electric element which vibrates the diaphragm 202 for emission of sound waves.

The actuator module 203 is attached in a specified position of the diaphragm 202 so that vibration of the actuator module 203 is transferred to the diaphragm 202. The diaphragm 202 is attached to a front case 206 having an aperture to expose a display screen of a liquid crystal display panel in its central portion, with a frame-shaped gasket member 204 to prevent entry of foreign matter such as dust or a like being interposed between the diaphragm 202 and the front case 206 (see FIGS. 23 to 25). Here, the gasket member 204 is so configured, as shown in FIG. 25, that its inner wall face 204a surrounds the aperture of the front case 206 and is bonded, by using a frame-shaped double-faced adhesive sheet, to the diaphragm 202 and to a putting-face 206a located in the circumferential portion of the aperture of the front case 206.

To mount the flat panel speaker 201 on the cabinet of the portable cellular phone 101, as the first step, the gasket member 204 is bonded to a circumferential portion of a rear of the diaphragm 202 by using the frame-shaped double-faced adhesive sheet and the double-faced adhesive sheet is pasted to a side of the gasket member 204 placed opposite to the diaphragm 202. Next, the actuator module 203 is bonded to a specified portion of the rear of the diaphragm 202 by using, for example, a double-faced adhesive tape.

Next, the diaphragm 202 is attached to the front case 206 in a manner in which the diaphragm 202 is properly positioned relative to the front case 206 and, as shown, for example, in FIG. 20, a display screen region 202s of the diaphragm 202 is not displaced and the gasket member 204 is bonded to an edge of the aperture of the front case 206 by using a double-faced adhesive sheet. Here, as shown in FIGS. 23 to 25, a specified rectangular portion 202a (for example, rectangular portion 202a in a lower left) out of four rectangular portions 202a of the diaphragm 202 is made to strike a corresponding corner portion 206c located on an inner wall face of a side wall 206b of the front case 206 for positioning and then the gasket member 204 is bonded to the putting-face 206a of the front case 206 by using the double-faced adhesive sheet and the diaphragm 202 is attached to the front case 206 (as for technology to position a rectangular portion of a component of a device relative to a cabinet, see Japanese Patent Application Laid-open No. 2002-258249).

On a front of the holding frame 113 is fixed a liquid crystal display panel by using, for example, a frame-shaped double-faced adhesive sheet and on a rear side of the holding frame 113 is assembled to be attached a printed circuit board in a overlain state. Next, a terminal of an FPC (Flexible Printed Circuit) board is connected to a connector placed at an end of the printed circuit board. Then, a rear cover is attached from the printed circuit board side, in an assembled manner, to the holding frame 113 to which the liquid crystal display panel, light source unit, printed circuit board, or a like are attached and a component group in which the diaphragm 202, actuator module 203, gasket member 204, or a like are attached is pasted to the front case 206 and the actuator module 203 is connected to the printed circuit board via a connector. Finally, the rear cover is attached and fitted in or fastened using a fixing element such as a female (internal) screw, male (external) screw, or a like to assemble the portable cellular phone.

A problem of the conventional technology to be solved is that the cabinet of the portable cellular phone 101 comes into contact with a side surface of the diaphragm 202 over a wide range of regions and, as a result, presses a side surface of the diaphragm 202, thus causing interference with vibration of the diaphragm 202 and degradation of an acoustic characteristic of the flat panel speaker 201. That is, as shown in FIGS. 23 to 25, especially in FIG. 24, side wall faces 202*m* and 202*n* of the rectangular portion 202*a* of the diaphragm 202 are in contact with inner wall faces 206*m* and 206*n* of the corner portions 206*c* of the front case 206, respectively, in a manner to form a plane-like boundary in the contacted portion in a cross section (to form a line-like boundary when viewed from a plane side) over a wide range of the contacted region. As a result, the side surfaces of the diaphragm 202 are pressed by the front case 206, causing interference with vibration of the diaphragm 202, thus effecting adversely acoustic characteristics (in terms of degradation of voice quality and decrease in voice volume (sound level)).

SUMMARY OF THE INVENTION

In view of the above, it is an object of the present invention to provide a structure and method for mounting a flat panel speaker which are capable of reliably and accurately positioning a diaphragm relative to a cabinet and of improving an acoustic characteristic of the flat panel speaker, the flat panel speaker used in the above structure and method, the diaphragm making up the flat panel speaker, and the electronic device in which the flat panel speaker is mounted.

According to a first aspect of the present invention, there is provided a structure for mounting a flat panel speaker in an electronic device in which the flat panel speaker to emit sound waves by vibrating a diaphragm is attached to a cabinet of the electronic device, the structure including:

at least one first protruding portion and at least one second protruding portion formed in side wall portions of the diaphragm, both being used to place the diaphragm on a putting-face of the cabinet, with the diaphragm being positioned relative to the cabinet; and at least one first struck portion and at least one second struck portion formed in the cabinet wherein the first struck portion is struck by the first protruding portion and the second struck portion is struck by the second protruding portion;

wherein the diaphragm is positioned relative to the cabinet in a first direction and in a second direction both intersecting each other and approximately parallel to the putting-face of the cabinet; and wherein, by striking of the first protruding portion against the first struck portion, the diaphragm is positioned relative to the cabinet in the first direction and, by striking of the second protruding portion against the second struck portion, the diaphragm is positioned relative to the cabinet in the second direction.

In the foregoing first aspect, a preferable mode is one wherein the first protruding portion is formed in one of two side wall portions making up specified rectangular portions formed in the diaphragm and the second protruding portion is formed in another of the two side wall portions and wherein concave portions are formed on the cabinet and the first struck portion is formed in one of two inner wall portions making up specified corner portions formed in the concave portions and the second struck portion is formed in another of the two inner wall portions making up the specified corner portions formed in the concave portions.

Also, a preferable mode is one wherein the first protruding portion and the second protruding portion are formed in a portion where a time average value of a sound pressure level of a sound wave to be emitted and an amplitude of the sound wave are comparatively small.

According to a second aspect of the present invention, there is provided a structure for mounting a flat panel speaker in an electronic device in which the flat panel speaker to emit sound waves by vibrating a diaphragm is attached to a cabinet of the electronic device, the structure including:

at least one first protruding portion and at least one second protruding portion formed in the cabinet, both being used to place the diaphragm on a putting-face of the cabinet, with the diaphragm positioned relative to the cabinet; and at least one first struck portion and at least one second struck portion formed in side wall portions of the diaphragm and the diaphragm is positioned relative to the cabinet in a first direction and in a second direction both intersecting each other and approximately parallel to the putting-face of the cabinet;

wherein, by striking of the first protruding portion against the first struck portion, the diaphragm is positioned relative to the cabinet in the first direction and, by striking of the second protruding portion against the second struck portion, the diaphragm is positioned relative to the cabinet in the second direction.

In the foregoing second aspect, a preferable mode is one wherein the first struck portion is formed in one of two side wall portions making up specified rectangular portions formed in the diaphragm and the second struck portion is formed in another of the two side wall portions and wherein concave portions are formed on the cabinet and the first protruding portion is formed in one of two inner wall portions making up specified corner portions formed in the concave portions and the second protruding portion is formed in another of the two inner wall portions making up the specified corner portions formed in the concave portions.

Also, a preferable mode is one wherein, in a specified portion on a rear of the diaphragm, an actuator to vibrate the diaphragm is placed and the first struck portion and the second struck portion are formed in a portion located by a specified distance or more apart from a portion where the actuator is placed.

Also, a preferable mode is one wherein the first struck portion and the second struck portion are formed in a portion where a time average value of a sound pressure of a sound wave to be emitted and an amplitude of the sound wave are comparatively small.

Also, a preferable mode is one wherein each of the first and second protruding portions is constructed so that its contour in a cross section is formed by a smooth curve with an outward convex shape and each of the first and second protruding portion is in contact with the first and second struck portion in a manner to form a point-like boundary in a contacted portion when viewed from a plane side.

Also, a preferable mode is one wherein the diaphragm includes a plate-like component being symmetric with respect to a line on a specified symmetric axis and the first direction is parallel to or perpendicular to the symmetric axis and the second direction intersects the first direction at right angles.

Also, a preferable mode is one wherein the diaphragm is put on the putting-face of the cabinet with a supporting member (component) bonded to a rear of the diaphragm and used to support the diaphragm being interposed between the diaphragm and the cabinet.

Also, a preferable mode is one wherein an aperture is formed at a bottom of the concave portion of the cabinet and the putting-face makes up an edge of the aperture and the diaphragm covers the aperture.

Also, a preferable mode is one wherein the supporting member includes a flat and frame-shaped component and is placed so that an inner wall face of the flat and frame-shaped component surrounds the aperture and has a foreign-matter entry preventing function of preventing entry of a foreign matter including dust from the aperture into the cabinet.

Also, a preferable mode is one wherein the supporting member, with being bonded to the diaphragm, supports the diaphragm while being deformed along at least a thickness direction according to vibration of the diaphragm.

Also, a preferable mode is one wherein the actuator has a piezo-electric element and is in contact with a specified portion of the diaphragm.

Furthermore, a preferable mode is one wherein the electric device has a display unit to display character information or image information and the diaphragm is made of a transparent material and also serves as a screen component to protect a display screen of the display unit.

According to a third aspect of the present invention, there is provided a diaphragm attached to a cabinet of an electronic device and making up a flat panel speaker for emitting sound waves by being vibrated, the diaphragm including:

at least one first protruding portion and at least one second protruding portion to place the diaphragm on a putting-face of the cabinet, with being positioned relative to the cabinet, when the diaphragm is attached to the cabinet, are formed in side wall portions of the diaphragm;

wherein the diaphragm is positioned relative to the cabinet in a first direction and in a second direction both intersecting each other and approximately parallel to the putting-face of the cabinet; and wherein, by striking of the first protruding portion against a first struck portion formed in the cabinet, the diaphragm is positioned relative to the cabinet in the first direction and, by striking of the second protruding portion against a second struck portion formed in the cabinet, the diaphragm is positioned relative to the cabinet in the second direction.

In the foregoing third aspect, a preferable mode is one wherein the diaphragm is attached to the cabinet in which concave portions are formed and the first struck portion is formed in one of two inner wall portions making up specified corner portions formed in the concave portions and the second struck portion is formed in another of the two inner wall portions making up the specified corner portions formed in the concave portions and in which the first protruding portion is formed in one of two side wall portions making up specified rectangular portions and the second protruding portion is formed in another of the two side wall portions.

Also, a preferable mode is one wherein, in a specified portion on a rear of the diaphragm, an actuator to vibrate the diaphragm is placed and the first protruding portion and the second protruding portion are formed in a portion located by a specified distance or more apart from a portion where the actuator is placed.

Also, a preferable mode is one wherein the first protruding portion and the second protruding portion are formed in a portion where a time average value of a sound pressure of a sound wave to be emitted and an amplitude of the sound wave are comparatively small.

Also, a preferable mode is one wherein each of the first and second protruding portions is constructed so that its contour in a cross section is formed by a smooth curve with an outward convex shape and each of the first and second protruding portion is in contact with the first and second struck portion in a manner to form a point-like boundary in a contacted portion when viewed from a plane side.

Also, a preferable mode is one wherein the diaphragm includes a plate-like component being symmetric with respect to a line on a specified symmetric axis and the first direction is parallel to or perpendicular to the symmetric axis and the second direction intersects the first direction at right angles.

Also, a preferable mode is one wherein a supporting member to support the diaphragm is bonded to a rear of the diaphragm and wherein the diaphragm is placed on the putting-face of the cabinet with the supporting member being interposed between the diaphragm and the cabinet.

Also, a preferable mode is one wherein the diaphragm is attached to the cabinet having an aperture formed at a bottom of the concave portions and a putting-face making up an edge of the aperture, in a manner to cover the aperture.

Also, a preferable mode is one wherein the supporting member includes a flat and frame-shaped component and is placed so that its inner wall face surrounds the aperture and has a foreign-matter entry preventing function of preventing entry of a foreign matter including dust from the aperture into the cabinet.

Also, a preferable mode is one wherein the supporting member, with being bonded to the diaphragm, supports the diaphragm while being deformed along at least a thickness direction according to vibration of the diaphragm.

Also, a preferable mode is one wherein the electric device has a display unit to display character information or image information and the diaphragm is made of a transparent material and also serves as a screen component to protect a display screen of the display unit.

According to a fourth aspect of the present invention, there is provided a flat panel speaker mounted on a cabinet of an electronic device for emitting sound waves by vibrating a diaphragm, including:

at least one first protruding portion and at least one second protruding portion formed in side wall portions of the diaphragm, both being used to place the diaphragm on a putting-face of the cabinet, with the diaphragm being positioned relative to the cabinet, when the diaphragm is attached to the cabinet;

wherein the diaphragm is positioned relative to the cabinet in a first direction and in a second direction both intersecting each other and approximately parallel to the putting-face of the cabinet; and wherein, by striking of the first protruding portion against the first struck portion, the diaphragm is positioned relative to the cabinet in the first direction and, by striking of the second protruding portion against the second struck portion, the diaphragm is positioned relative to the cabinet in the second direction.

In the foregoing fourth aspect, a preferable mode is one wherein the flat panel speaker is attached to the cabinet in which concave portions are formed and the first struck portion is formed in one of two inner wall portions making up specified corner portions formed in the concave portions and the second struck portion is formed in another of the two inner wall portions making up the specified corner portions formed in the concave portions and in which the first protruding portion is formed in one of two side wall portions making up specified rectangular portions and the second protruding portion is formed in another of the two side wall portions.

Also, a preferable mode is one wherein, in a specified portion on a rear of the diaphragm, an actuator to vibrate the diaphragm is placed and the first protruding portion and the second protruding portion are formed in a portion located by a specified distance or more apart from a portion where the actuator is placed.

Also, a preferable mode is one wherein the first protruding portion and the second protruding portion are formed in a portion where a time average value of a sound pressure of a sound wave to be emitted and an amplitude of the sound wave are comparatively small.

Also, a preferable mode is one wherein each of the first and second protruding portions is constructed so that its contour in a cross section is formed by a smooth curve with an outward convex shape and each of the first and second protruding portion is in contact with the first and second struck portion in a manner to form a point-like boundary in a contacted portion when viewed from a plane side.

Also, a preferable mode is one wherein the diaphragm includes a plate-like component being symmetric with respect to a line on a specified symmetric axis and the first direction is parallel to or perpendicular to the symmetric axis and the second direction intersects the first direction at right angles.

Also, a preferable mode is one wherein the diaphragm is placed on the putting-face of the cabinet with the supporting member bonded to a rear of the diaphragm and used to support the diaphragm being interposed between the diaphragm and the cabinet.

Also, a preferable mode is one wherein the diaphragm is attached to the cabinet having an aperture formed at a bottom of the concave portions and a putting-face making up an edge of the aperture, in a manner to cover the aperture.

Also, a preferable mode is one wherein the supporting member includes a flat and frame-shaped component and is placed so that its inner wall face surrounds the aperture and has a foreign-matter entry preventing function of preventing entry of a foreign matter including dust from the aperture into the cabinet.

Also, a preferable mode is one wherein the supporting member, with being bonded to the diaphragm, supports the diaphragm while being deformed along at least a thickness direction according to vibration of the diaphragm.

Also, a preferable mode is one wherein the actuator has a piezo-electric element and is in contact with a specified portion of the diaphragm.

Also, a preferable mode is one wherein the electric device has a display unit to display character information or image information and the diaphragm is made of a transparent material and also serves as a screen component to protect a display screen of the display unit.

According to a fifth aspect of the present invention, there is provided an electronic device having the structure for mounting a flat panel speaker to emit sound waves by vibrating a diaphragm is attached to a cabinet of the electronic device, the structure including:

at least one first protruding portion and at least one second protruding portion formed in side wall portions of the diaphragm, both being used to place the diaphragm on a putting-face of the cabinet, with the diaphragm being positioned relative to the cabinet; and at least one first struck portion and at least one second struck portion formed in the cabinet wherein the first struck portion is struck by the first protruding portion and the struck portion is struck by the second protruding portion;

wherein the diaphragm is positioned relative to the cabinet in a first direction and in a second direction both intersecting each other and approximately parallel to the putting-face of the cabinet; and wherein, by striking of the first protruding portion against the first struck portion, the diaphragm is positioned relative to the cabinet in the first direction and, by striking of the second protruding portion against the second struck portion, the diaphragm is positioned relative to the cabinet in the second direction.

According to a sixth aspect of the present invention, there is provided a method for mounting a flat panel speaker in an electronic device in which the flat panel speaker to emit sound waves by vibrating a diaphragm is attached to a cabinet of the electronic device, the method including:

a step of preparing the diaphragm in which at least one first protruding portion and at least one second protruding portion are formed in its side wall portions, both being used to place the diaphragm on a putting-face of the cabinet with the diaphragm being positioned relative to the cabinet and of preparing the cabinet in which at least one first struck portion and at least one second struck portion are formed wherein the first struck portion is struck by the first protruding portion and the struck portion is struck by the second protruding portion; and a step of positioning the diaphragm relative to the cabinet in a first direction, out of first and second directions both intersecting each other and being approximately parallel to the putting-face of the cabinet, by striking of the first protruding portion against the first struck portion, and of positioning the diaphragm relative to the cabinet in the second direction by striking of the second protruding portion against the second struck portion.

In the foregoing sixth aspect, a preferable mode is one wherein the first protruding portion is formed in one of the two side wall portions making up specified rectangular portions formed in the diaphragm and the second protruding portion is formed in another of the two side wall portions and wherein concave portions are formed on the cabinet and the first struck portion is formed in one of two inner wall portions making up specified corner portions formed in the concave portions and the second struck portion is formed in another of the two inner wall portions making up the specified corner portions formed in the concave portions.

Also, a preferable mode is one wherein, in a specified portion on a rear of the diaphragm, an actuator to vibrate the diaphragm is placed and the first protruding portion and the second protruding portion are formed in a portion located by a specified distance or more apart from a portion where the actuator is placed.

Also, a preferable mode is one wherein the first protruding portion and the second protruding portion are formed in a portion where a time average value of a sound pressure of a sound wave to be emitted and an amplitude of the sound wave are comparatively small.

According to a seventh aspect of the present invention, there is provided a method for mounting a flat panel speaker in an electronic device in which the flat panel speaker to emit sound waves by vibrating a diaphragm is attached to a cabinet of the electronic device, the method including:

a step of preparing the cabinet in which at least one first protruding portion and at least one second protruding portion are formed, both being used to place the diaphragm on a putting-face of the cabinet with the diaphragm being positioned relative to the cabinet and of preparing the diaphragm in which at least one first struck portion and at least one second struck portion are formed in its side wall portions wherein the first struck portion is struck by the first protruding portion and the struck portion is struck by the second protruding portion; and a step of positioning the diaphragm relative to the cabinet in a first direction, out of first and second directions both intersecting each other and being approximately parallel to the putting-face of the cabinet, by striking of the first protruding portion against the first struck portion, and of positioning the diaphragm relative to the cabinet in the second direction by striking of the second protruding portion against the second struck portion.

In the foregoing seventh aspect, a preferable mode is one wherein the first protruding portion is formed in one of the two side wall portions making up specified rectangular portions formed in the diaphragm and the second protruding portion is formed in another of the two side wall portions and wherein concave portions are formed on the cabinet and the first struck portion is formed in one of two inner wall portions making up specified corner portions formed in the concave portions and the second struck portion is formed in another of the two inner wall portions making up the specified corner portions formed in the concave portions.

Also, a preferable mode is one wherein, in a specified portion on a rear of the diaphragm, an actuator to vibrate the diaphragm is placed and the first protruding portion and the second protruding portion are formed in a portion located by a specified distance or more apart from a portion where the actuator is placed.

Also, a preferable mode is one wherein the first protruding portion and the second protruding portion are formed in a portion where a time average value of a sound pressure of a sound wave to be emitted and an amplitude of the sound wave are comparatively small.

Also, a preferable mode is one wherein each of the first and second protruding portions is constructed so that its contour in a cross section is formed by a smooth curve with an outward convex shape and each of the first and second protruding portion is in contact with the first and second struck portion in a manner to form a point-like boundary in a contacted portion when viewed from a plane side.

Also, a preferable mode is one wherein the diaphragm includes a plate-like component being symmetric with respect to a line on a specified symmetric axis and the first direction is parallel to or perpendicular to the symmetric axis and the second direction intersects the first direction at right angles.

Also, a preferable mode is one wherein the diaphragm is placed on the putting-face of the cabinet with the supporting member bonded to a rear of the diaphragm and used to support the diaphragm being interposed between the diaphragm and the cabinet.

Also, a preferable mode is one wherein an aperture is formed at a bottom of the concave portion of the cabinet and the putting-face makes up an edge of the aperture and the diaphragm covers the aperture.

Also, a preferable mode is one wherein the supporting member includes a flat and frame-shaped component and is placed so that its inner wall face surrounds the aperture so as to prevent the entry of a foreign matter including dust from the aperture into the cabinet.

Also, a preferable mode is one wherein the supporting member, with being bonded to the diaphragm, supports the diaphragm while being deformed along at least a thickness direction according to vibration of the diaphragm.

Also, a preferable mode is one wherein the actuator has a piezo-electric element and is in contact with a specified portion of the diaphragm.

Furthermore, a preferable mode is one wherein the electric device has a display unit to display character information or image information and the diaphragm is made of a transparent material and also serves as a screen component to protect a display screen of the display unit.

With the above configurations, by striking of the first protruding portion against the first struck portion, the diaphragm is properly positioned relative to the cabinet along the first direction and, by striking of the second protruding portion against the second struck portion, the diaphragm is properly positioned relative to the cabinet along the second direction and the diaphragm comes into contact with the cabinet only in a contacted portion between the first protruding portion and the first struck portion and only in a contacted portion between the second protruding portion and the struck portion in a state in which the diaphragm is properly positioned relative to the cabinet and is attached to the cabinet and, therefore, a region in which a side surface of the diaphragm is pressed by the cabinet is reduced greatly, which enables suppression of interference with vibration of the diaphragm caused by the cabinet, thus making it possible to reliably and accurately position the diaphragm relative to the cabinet and, as a result, to improve an acoustic characteristic of the flat panel speaker.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings. The purpose of the present invention is to enable suppression of interference with vibration of a diaphragm caused by a cabinet and to make it possible to reliably and accurately position the diaphragm relative to the cabinet. Improvement of an acoustic characteristic of a flat panel speaker is achieved by a structure and method in which, by striking of the first protruding portion against the first struck portion, the diaphragm is properly positioned relative to the cabinet along the first direction and, by striking of the second protruding portion against the second struck portion, the diaphragm is properly positioned relative to the cabinet along the second direction. The diaphragm comes into contact with the cabinet only in a contacted portion between the first protruding portion and the first struck portion and only in a contacted portion between the second protruding portion and the struck portion in a state in which the diaphragm is properly positioned relative to the cabinet and is attached to the cabinet and, therefore, a region in which a side surface of the diaphragm is pressed by the cabinet is reduced greatly.

Embodiment

Figure 1:
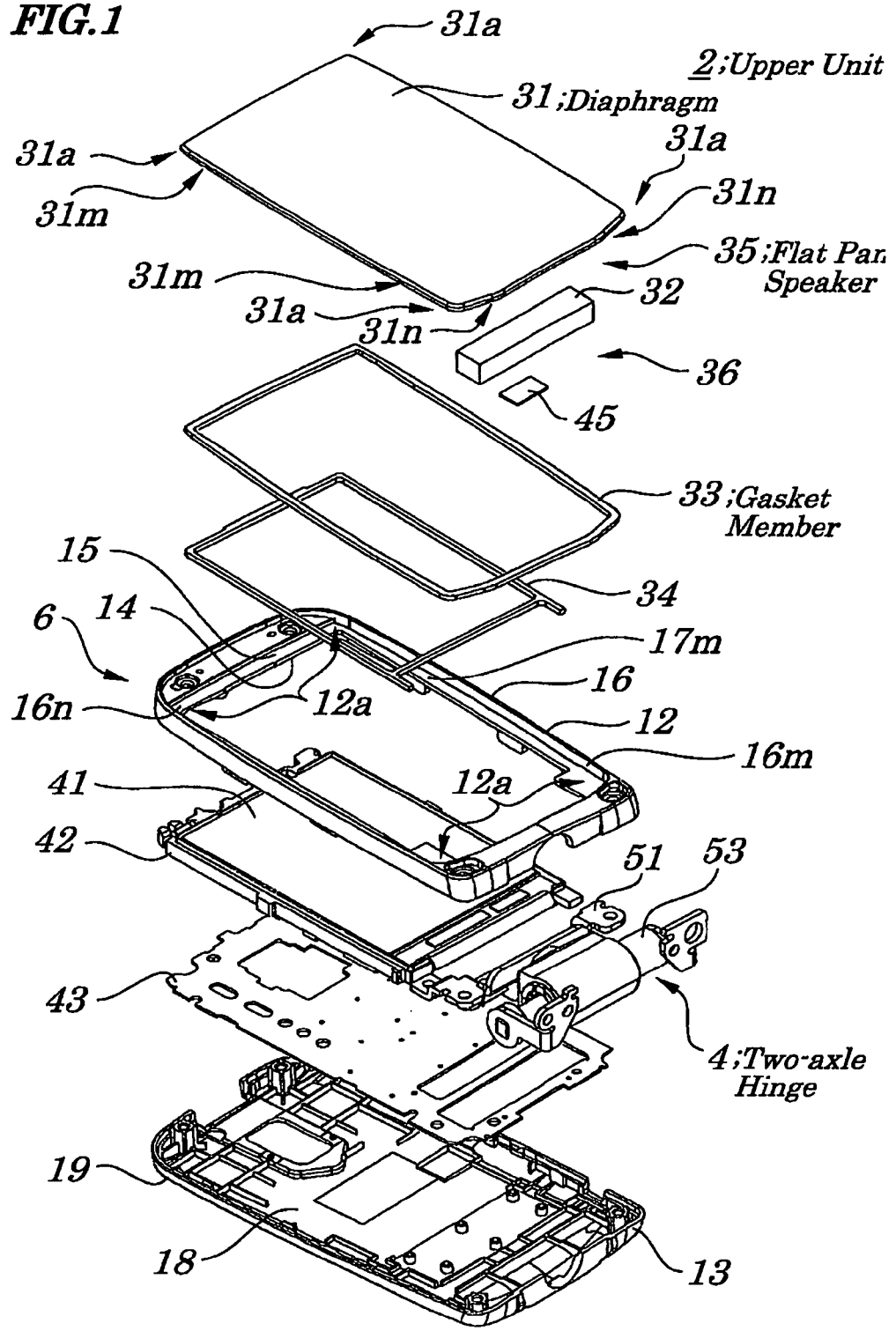
FIG. 1 is an exploded perspective view showing configurations of an upper unit obtained by disassembling the upper unit of a portable cellular phone and by viewing the upper unit from its front side according to an embodiment of the present invention.
Figure 2:
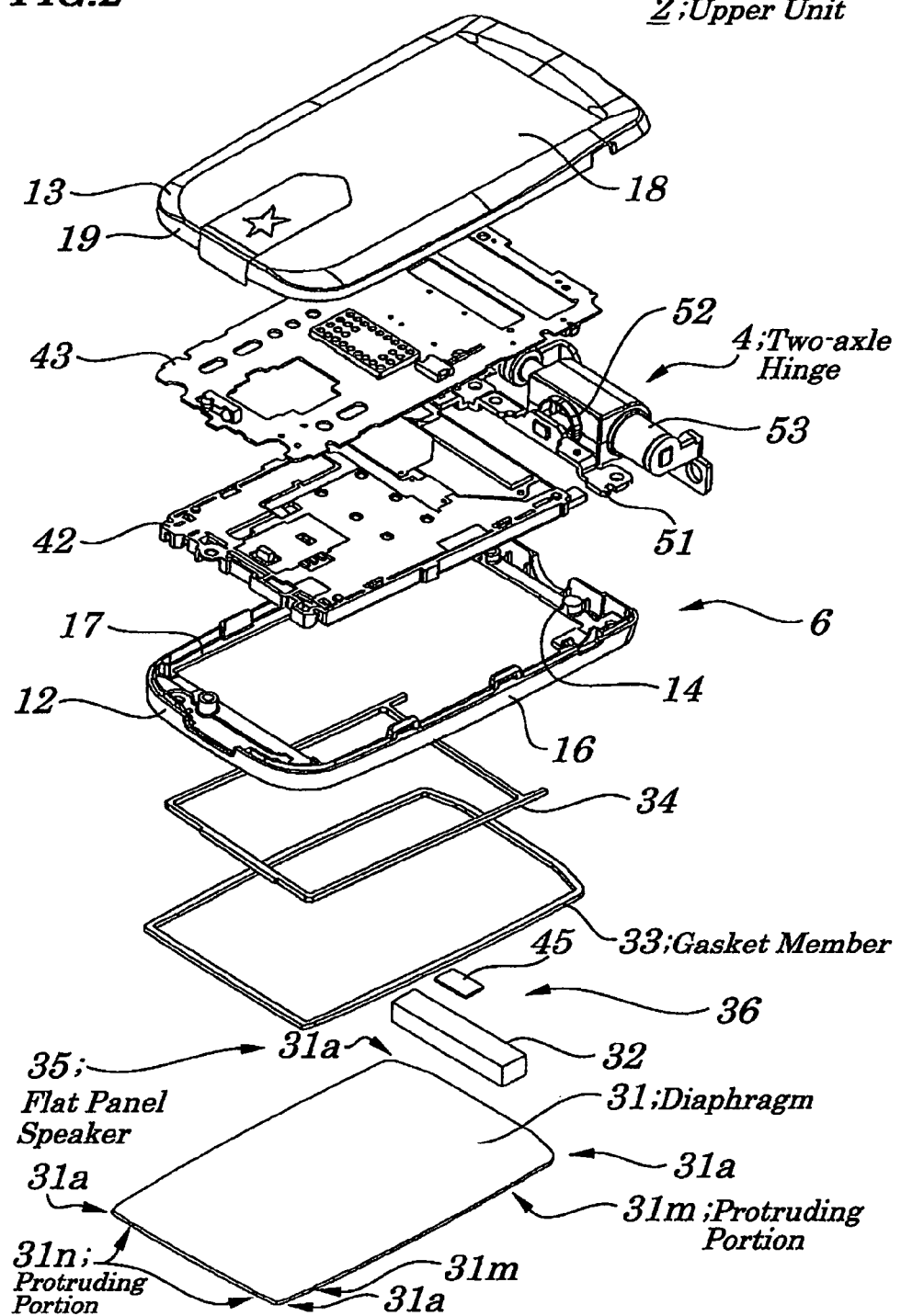
FIG. 2 is an exploded perspective view showing configurations of the upper unit obtained by disassembling the upper unit of the portable cellular phone and by viewing the upper unit from its rear side according to the embodiment of the present invention.
Figure 3:
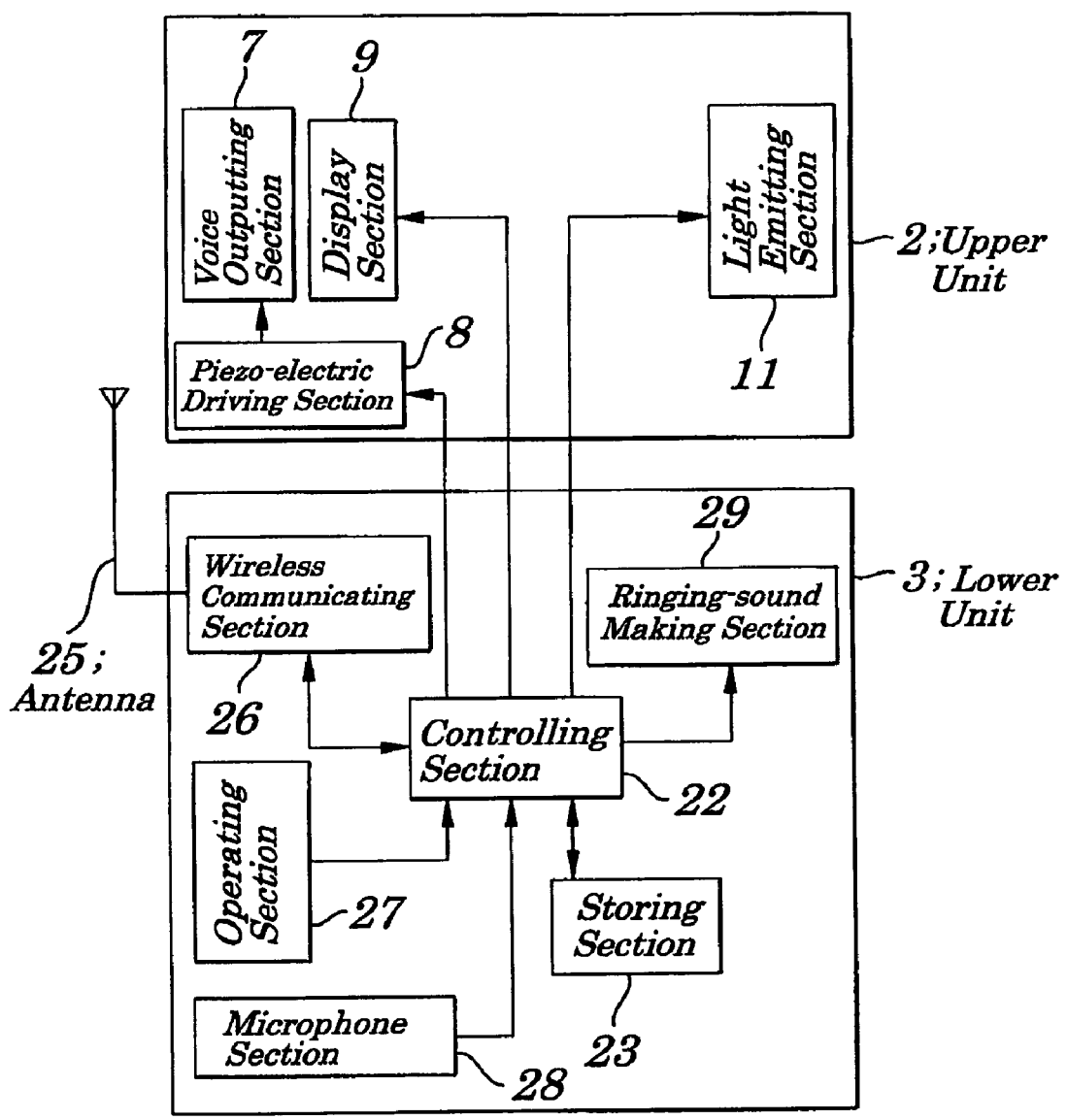
FIG. 3 is a block diagram showing configurations of the portable cellular phone according to the embodiment of the present invention.
Figure 4:
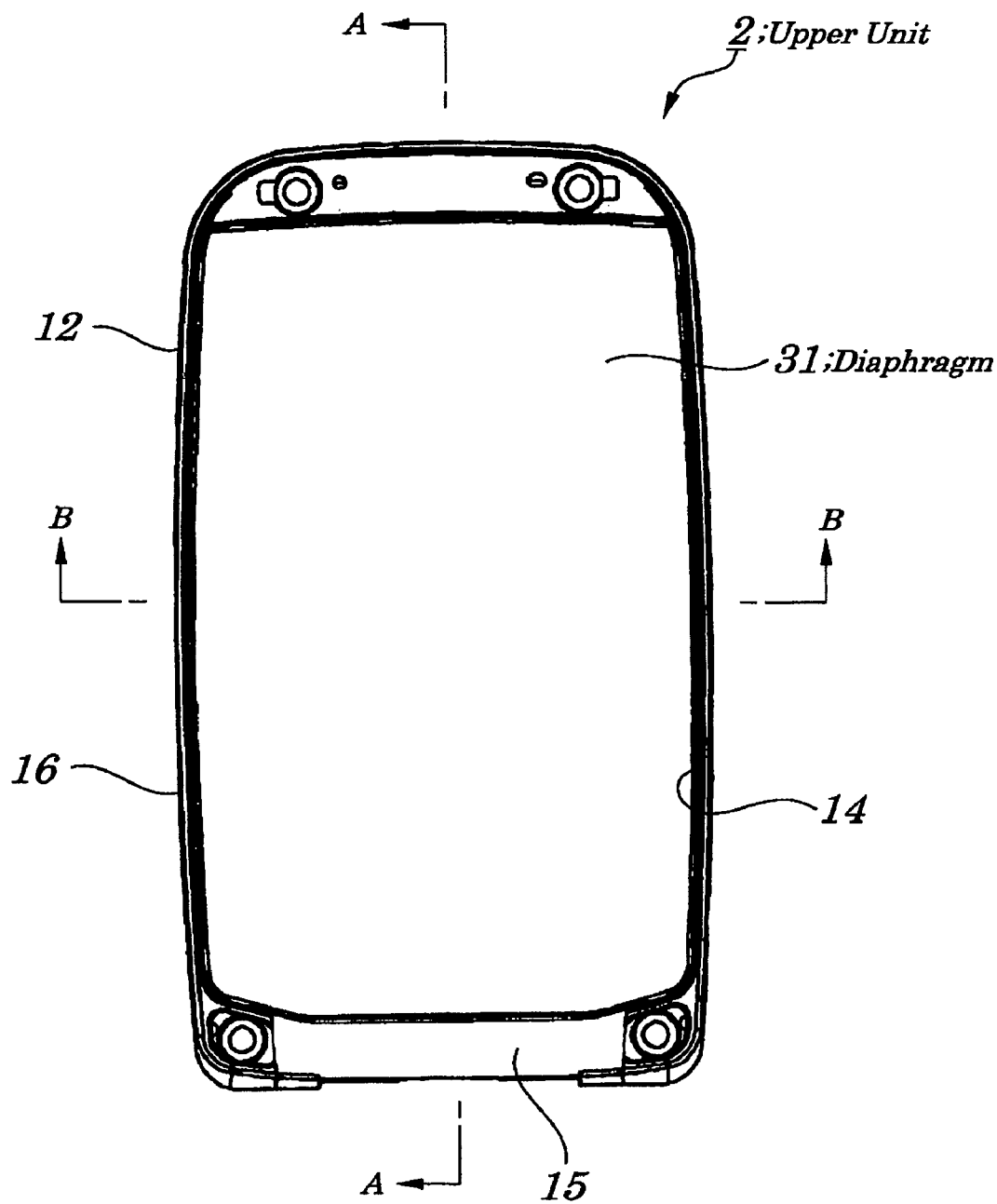
FIG. 4 is a plan view showing configurations of the upper unit of the portable cellular phone according to the embodiment of the present invention.
Figure 5:
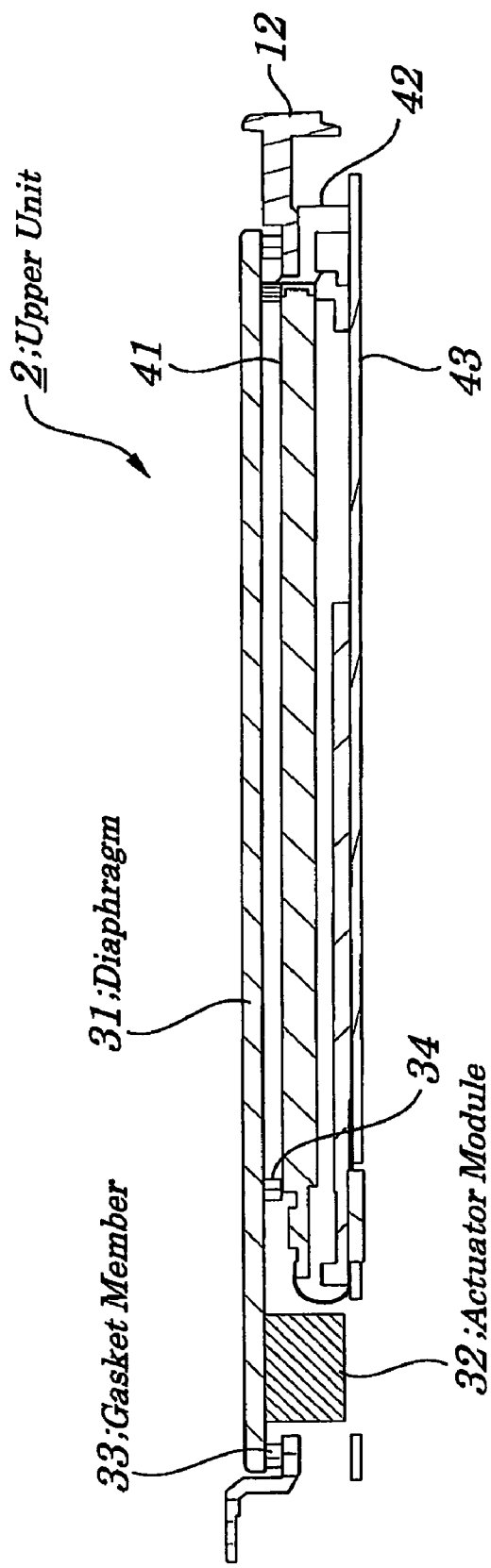
FIG. 5 is a cross-sectional view of the upper unit, taken along a line A-A of FIG. 4.
Figure 6:
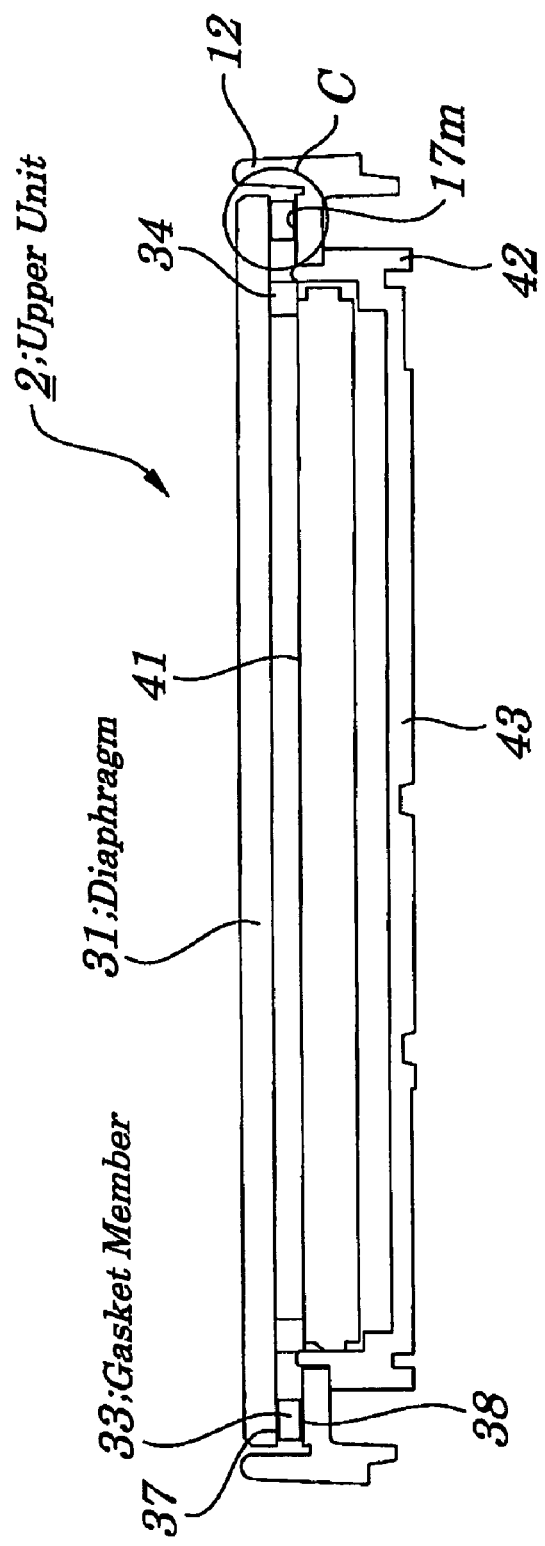
FIG. 6 is a cross-sectional view of the upper unit, taken along a line B-B of FIG. 4.
Figure 7:
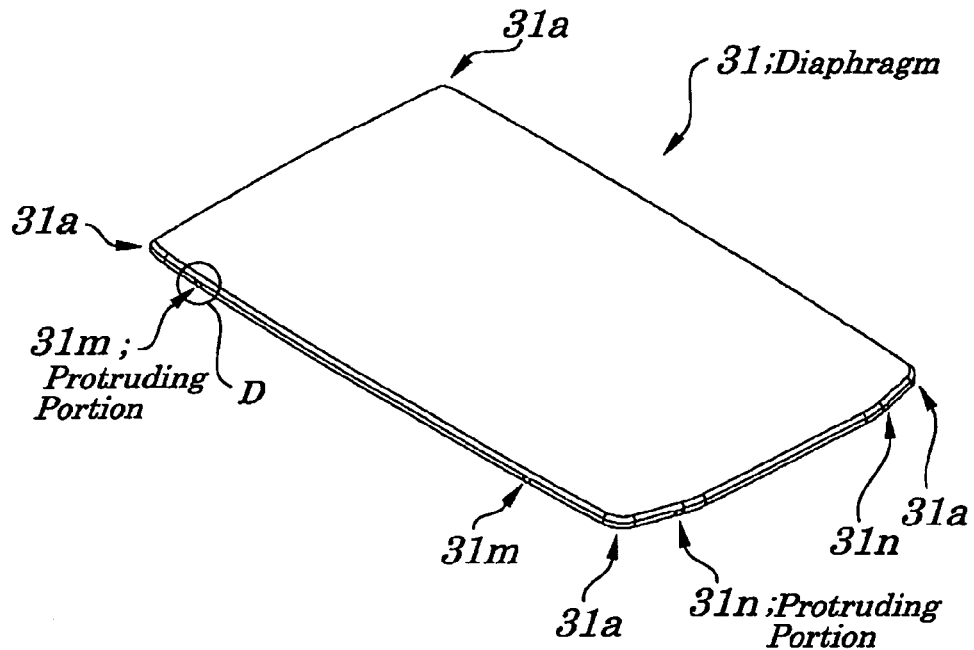
FIG. 7 is a perspective view showing configurations of a diaphragm of a voice outputting section in the portable cellular phone of the embodiment of the present invention.
Figure 8:
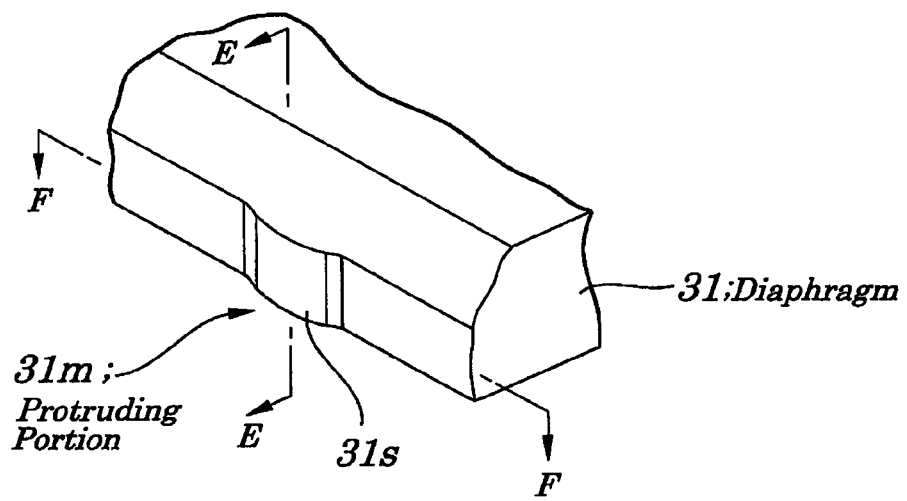
FIG. 8 is an enlarged view obtained by expanding a portion D of FIG. 7.
Figure 9:
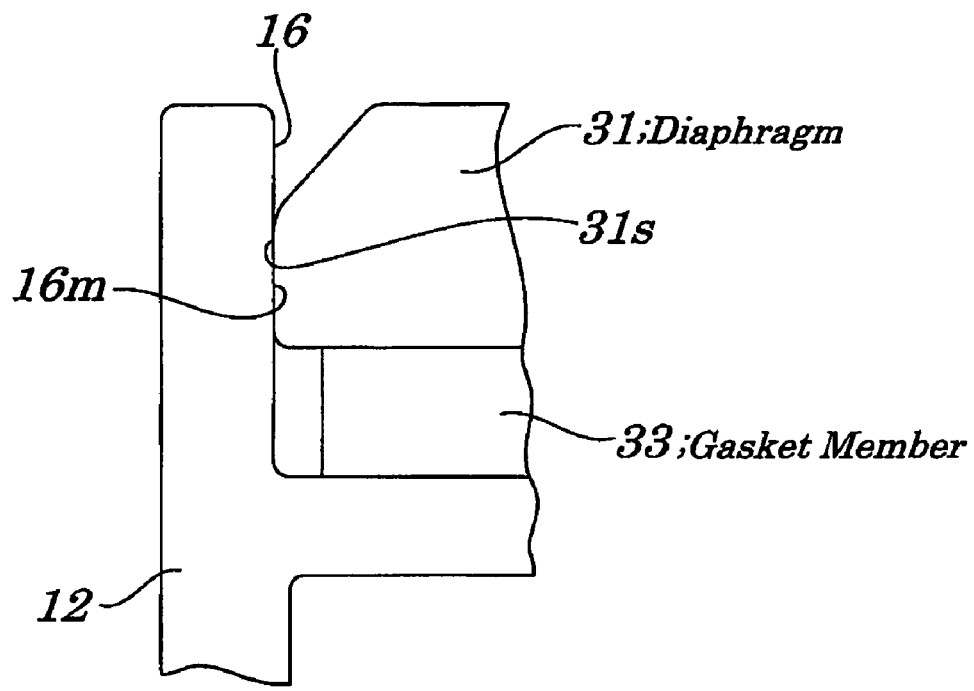
FIG. 9 is a cross-sectional view, taken along a line E-E of FIG. 8, which shows a state in which the diaphragm is positioned and placed in an upper cabinet of the portable cellular phone according to the embodiment of the present invention.
Figure 10:
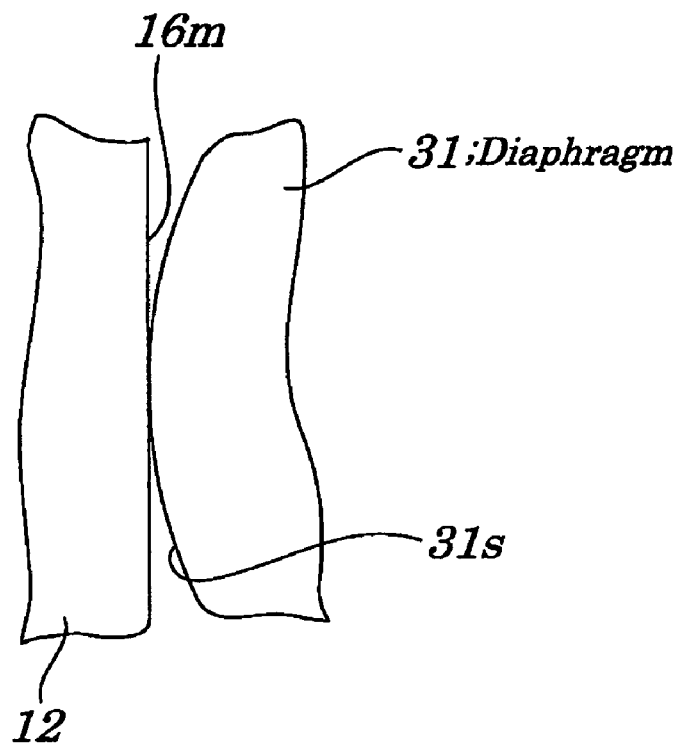
FIG. 10 is a cross-sectional view, taken along a line F-F of FIG. 8, which shows a state in which the diaphragm is positioned relative to the upper cabinet according to the embodiment of the present invention.
Figure 11:
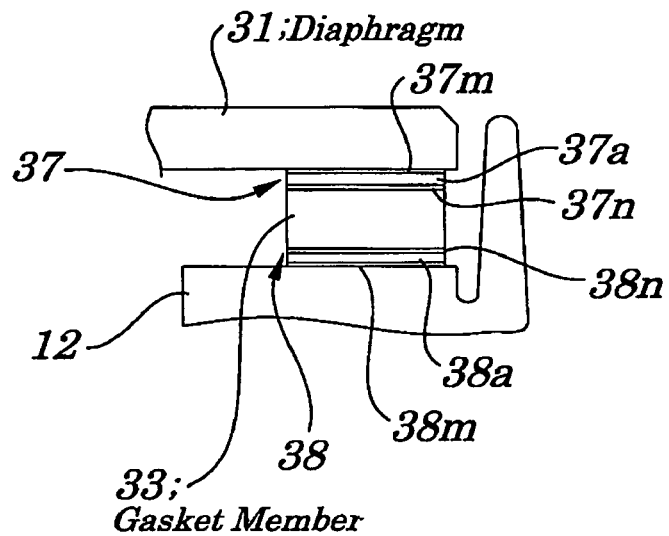
FIG. 11 is an enlarged view obtained by expanding a portion C of FIG. 6.
Figure 12:
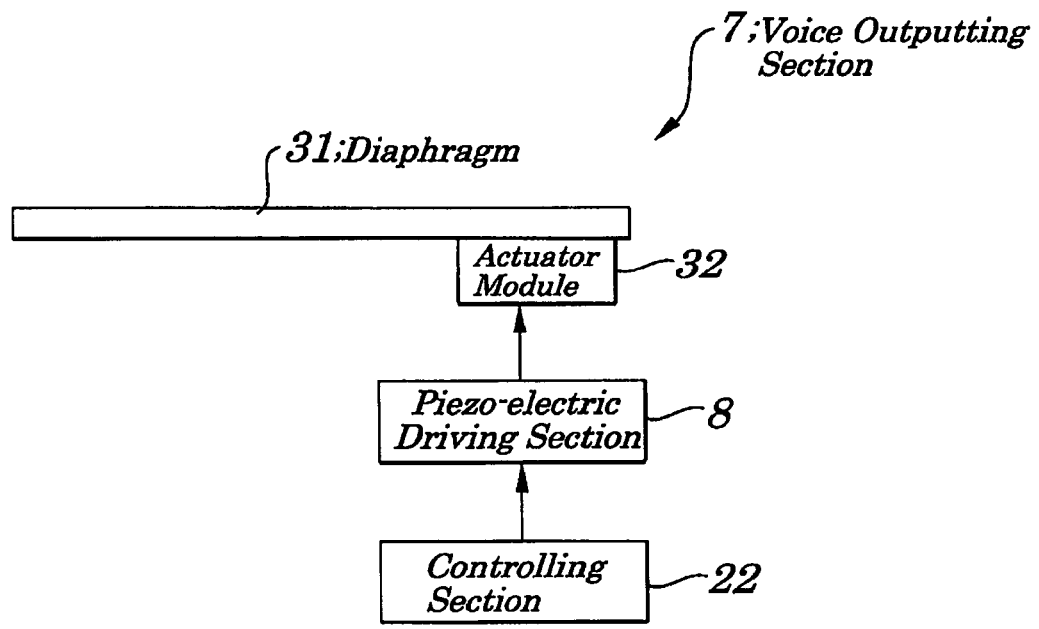
FIG. 12 is a block diagram showing configurations of the voice outputting section according to the embodiment of the present invention.
Figure 13:
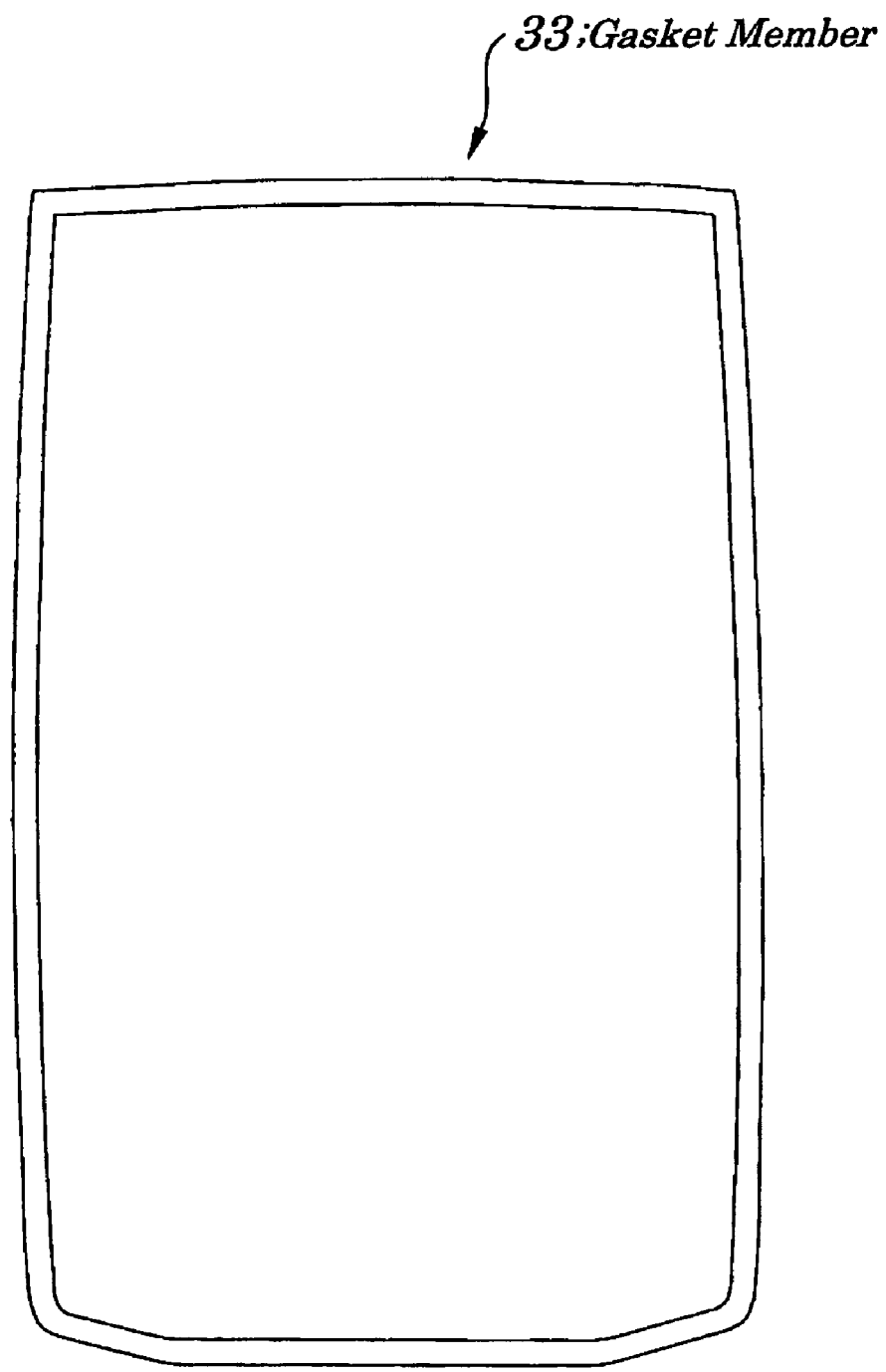
FIG. 13 is a plan view showing configurations of a gasket member according to the embodiment of the present invention.
Figure 14:
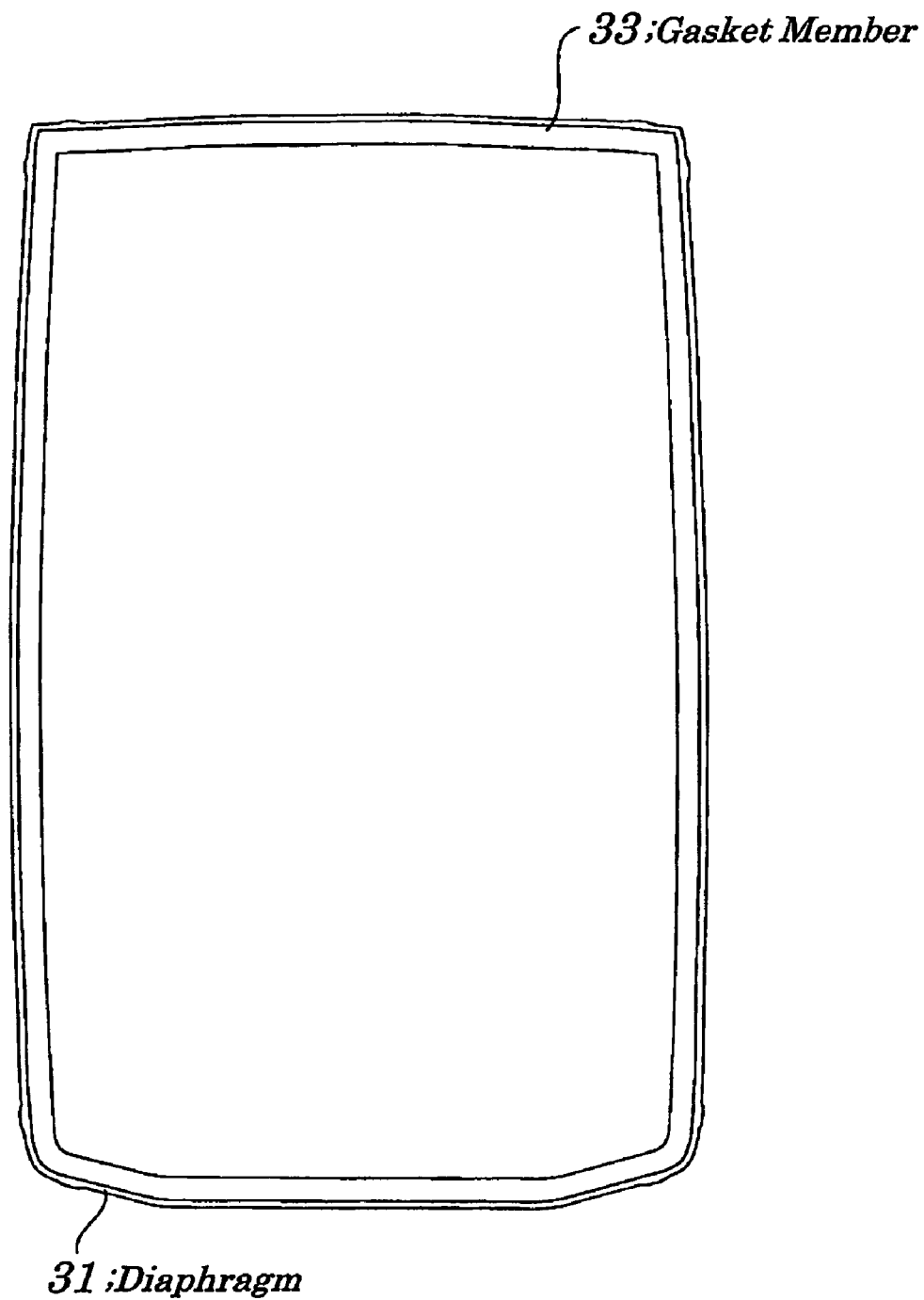
FIG. 14 is a bottom view showing a state in which the gasket member is attached to the diaphragm according to the embodiment of the present invention.
Figure 15:
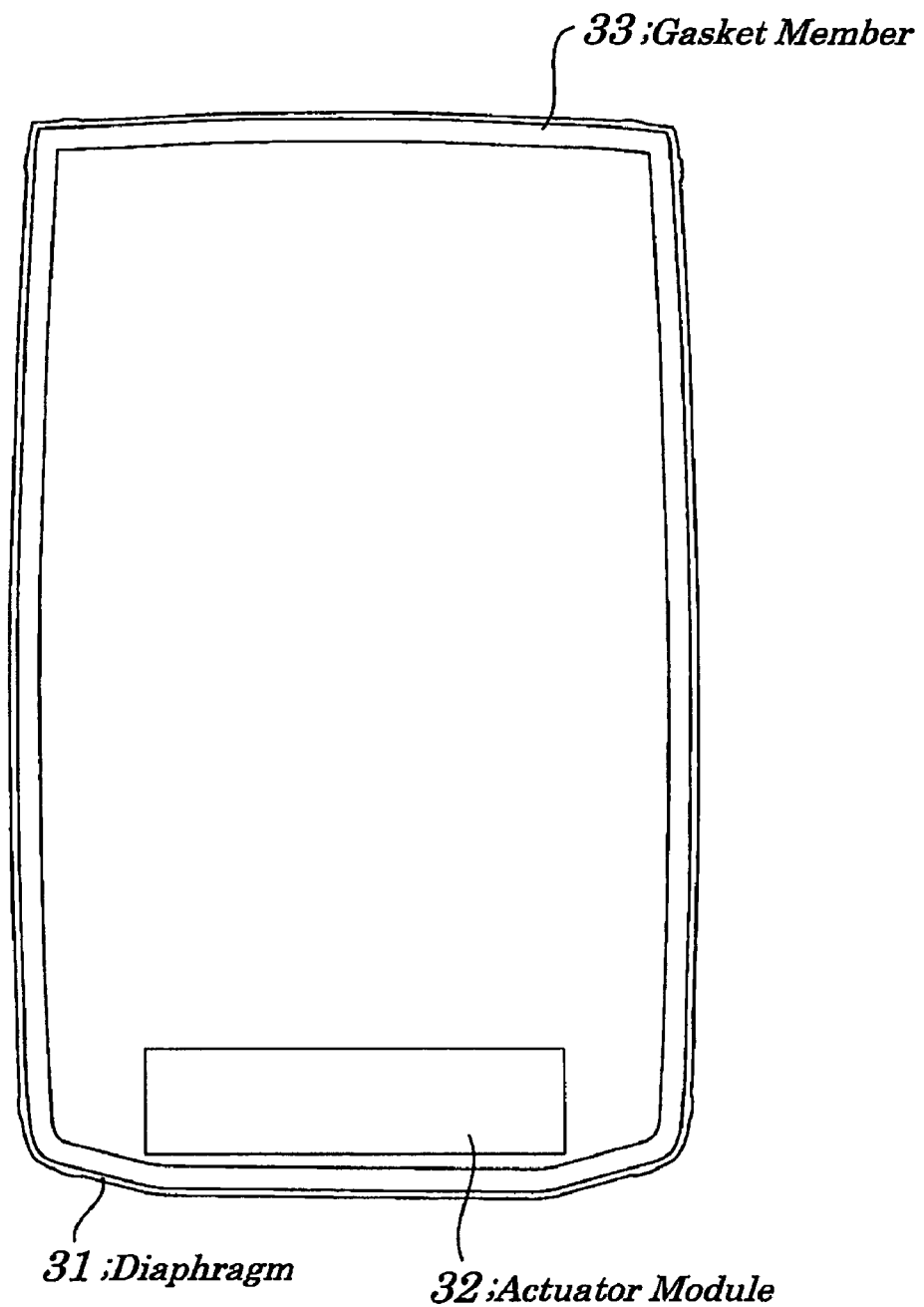
FIG. 15 is a bottom view showing a state in which the gasket member and an actuator module are attached to the diaphragm according to the embodiment of the present invention.
Figure 16:
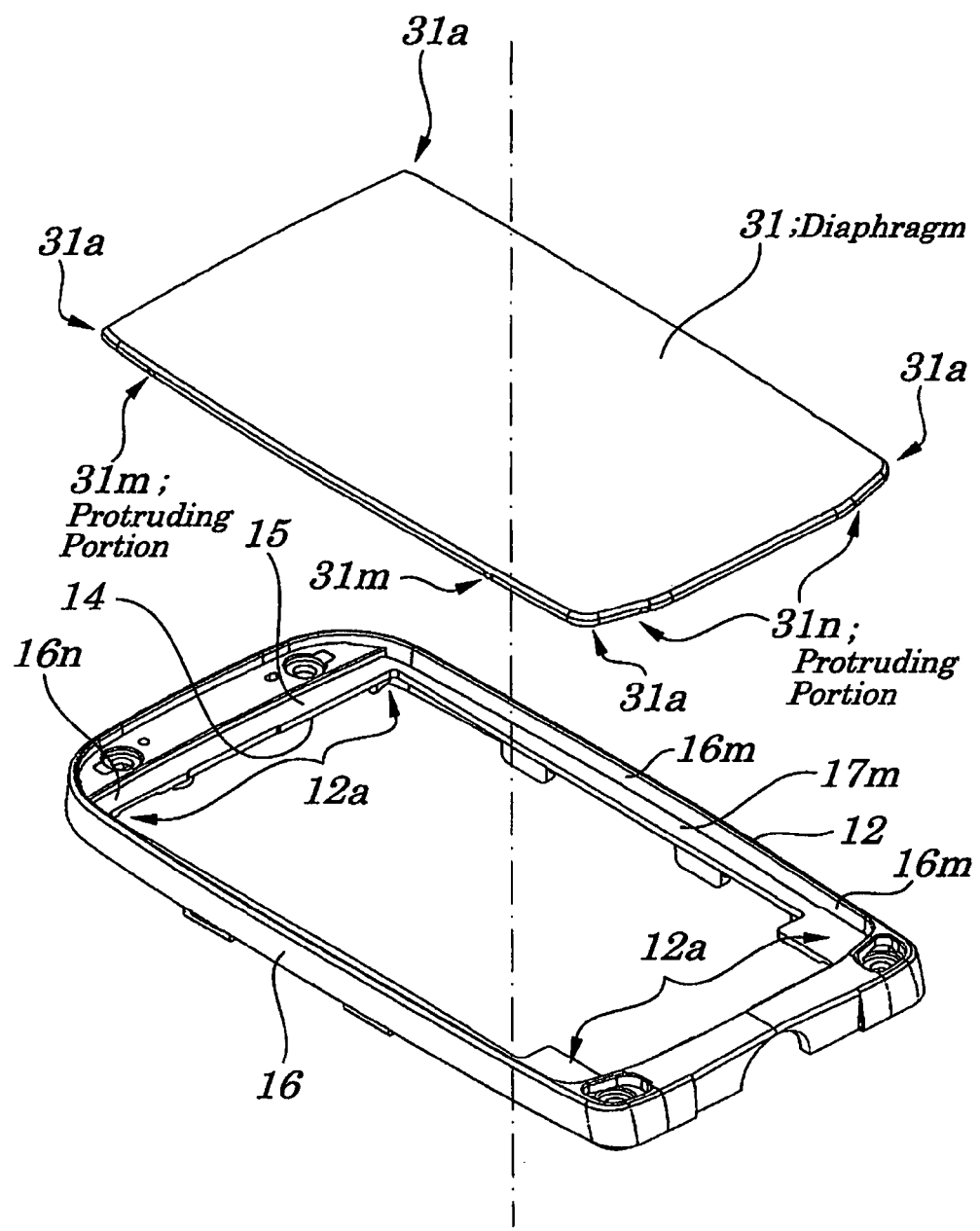
FIG. 16 is an exploded perspective view to explain a method of attaching the diaphragm to the cabinet according to the embodiment of the present invention.

FIG. 1 is an exploded perspective view showing configurations of an upper unit 2 obtained by disassembling the upper unit 2 of a portable cellular phone 1 and by viewing the upper unit from its front side according to an embodiment of the present invention. FIG. 2 is an exploded perspective view showing configurations of the upper unit 2 obtained by disassembling the upper unit 2 of the portable cellular phone 1 and by viewing the upper unit 2 from its rear side according to the embodiment. FIG. 3 is a block diagram showing configurations of the portable cellular phone 1 according to the embodiment. FIG. 4 is a plan view showing configurations of the upper unit 2 of the portable cellular phone 1 according to the embodiment. FIG. 5 is a cross-sectional view of the upper unit 2, taken along a line A-A of FIG. 4. FIG. 6 is a cross-sectional view of the upper unit 2, taken along a line B-B of FIG. 4. FIG. 7 is a perspective view showing configurations of a diaphragm 31 of a voice outputting section 7 in the portable cellular phone 1 of the embodiment. FIG. 8 is an enlarged view obtained by expanding a portion D of FIG. 7. FIG. 9 is a cross-sectional view, taken along a line E-E of FIG. 8, which shows a state in which the diaphragm 31 is properly positioned and placed on an upper cabinet 6 of the portable cellular phone 1 according to the embodiment. FIG. 10 is a cross-sectional view, taken along a line F-F of FIG. 8, which shows a state in which the diaphragm 31 is properly positioned relative to the upper cabinet 6 according to the embodiment. FIG. 11 is an enlarged view obtained by expanding a portion C of FIG. 6. FIG. 12 is a block diagram showing configurations of the voice outputting section 7 according to the embodiment. FIG. 13 is a plan view showing configurations of a gasket member (supporting component) 33. FIG. 14 is a bottom view showing a state in which the gasket member 33 is attached to the diaphragm 31 according to the embodiment. FIG. 15 is a bottom view showing a state in which the gasket member 33 and an actuator module 32 are attached to the diaphragm 31 of the embodiment. FIG. 16 is an exploded perspective view to explain a method of attaching the diaphragm 31 to the upper cabinet 6 according to the embodiment.

The portable cellular phone 1 has an original function for carrying out a telephone conversation and data communication function of allowing electronic mail to be received and transmitted and of being connected to the Internet to enable home pages to be browsed. Also, the portable cellular phone 1 is so configured as to include foldable cabinets (upper cabinet 6 and a lower cabinet), as shown in FIGS. 1 to 3, and that the upper unit 2 and a lower unit 3 can be freely opened and closed in conjunction with each other and that the upper unit 2 and the lower unit 3 are connected via a two-axle hinge 4 in a manner in which one unit is allowed to rotate freely relative to the other unit in a position surrounding one rotational shaft placed in a direction perpendicular to another rotational shaft for closing and opening.

The upper unit 2 is roughly configured, as shown in FIGS. 1 to 3, so as to include the voice outputting section 7 to output, for example, a receiving voice, a piezo-electric driving section 8 to drive the voice outputting section (speaker) 7, a display section 9 made up of a liquid crystal display device on which a function setting screen, standby screen, or a like are displayed, and a light emitting section 11 having an LED (Light Emitting Diode) to emit light, for example, when an incoming call arrives or when a telephone conversation is carried out, all being mounted on the upper cabinet 6 making up the foldable and flat upper cabinet 6. The cabinets (upper cabinet 6 and a lower cabinet) are made of a die-casting formed product of, for example, alloys of magnesium and have a front case 12 making up a front side portion and a rear cover 13 making up a rear side portion. The front case 12 and the rear cover 13 are assembled in combination, in the inside of which the voice outputting section 7, the display section 9, the light emitting section 11 are housed, both being fitted in or fastened by a fixing element such as a female screw, male screw, or a like.

The front case 12 is roughly configured so as to have a rectangular plate 15 in the central portion of which an aperture 14 to expose a display screen of a liquid crystal display panel 41 is formed with a side-wall 16 mounted in a circumferential portion of the rectangular plate 15 in a standing state. On a surface of an edge 17 of the aperture 14 placed, in a protruding state, in a side portion (in the inside portion) on an inner wall side of the side wall 16 of the rectangular plate 15 is formed a putting-face 17m used to put the diaphragm 31 thereon with the gasket member 33 described later being interposed between the rectangular plate 15 and the diaphragm 31. Moreover, the rear cover 13 is so configured roughly that a side wall 19 is placed in a standing manner in a portion surrounding a rectangular plate 18.

The lower unit 3 is roughly configured so that, on the foldable and flat lower cabinet are mounted, as shown in FIG. 3, a controlling section 22 to control each component making up the portable cellular phone 1 proper, a storing section 23 to store processing programs to be run by the controlling section 22 and/or various data or a like, a wireless communicating section 26 to receive and transmit radio waves through an antenna 25 and to carry out a telephone conversation and data communication according to a specified protocol, an operating section 27 made up of many various operation keys to input numeral and/or characters, a microphone section 28 made up of a telephone microphone to input a transmitting voice, and a ringing-sound making section 29 to generate an incoming call at time of arrival of an incoming call.

The voice outputting section 7, as shown FIGS. 1 to 15, is made of a transparent material of, for example, an acrylic resin, and is so configured as to include the diaphragm 31 also serving as a screen component to protect the liquid crystal display panel 41, the actuator module 32 having a piezoelectric element to vibrate the diaphragm 31 to make a sound wave be emitted, the gasket member 33 made of, for example, silicone rubber having a shape of a flat frame which is used to prevent the entry of a foreign matter such as dust, or a like into the inside of the upper cabinet 6, a dust preventing cushion component 34 made of, for example, urethane foam having a shape of a frame and being placed inside of the gasket member 33 to prevent the entry of dust into the inside which also avoids adhesion of dust to a surface of the liquid crystal display panel 41. Here, the diaphragm 31 and the actuator module 32 make up a flat panel speaker 35.

The diaphragm 31 is approximately rectangular viewed from a plane side and has four rectangular portions 31a and a protruding portion 31m for positioning is formed on each of the rectangular portions 31a located on side wall faces making up longer sides of the rectangular diaphragm 31, while a protruding portion 31n also for positioning is formed on each of the rectangular portions 31a located on side wall faces making up the diaphragm 31 is attached to the front case 12. In the embodiment, each of the four rectangular portions 31a strikes a corresponding corner of each inner wall face making up each side wall 16 of the front case 12 so that the diaphragm 31 is attached to the front case 12 with the diaphragm 31 properly positioned relative to the front case 12. That is, the protruding portion 31m of the rectangular portion 31a strikes a side wall face 16m of a corresponding corner portion 12a of each side wall 16 of the front case 12, thus making it possible to properly position the diaphragm 31 relative to the front case 12. With the diaphragm 31 being properly positioned, the diaphragm 31 is attached to the front case 12 with the gasket member 33 bonded to the putting-face 17m interposed between the diaphragm 31 and the front case 12.

The diaphragm 31, as shown in FIGS. 8 and 9, is formed so that its upper portion is approximately trapezoidal in a cross section and the protruding portion 31m (31n) has a circular-arc curved surface 31s with a specified curvature in its cross section and is in contact with the side wall face 16m (16n) in a manner to form a line-like boundary in a contacted portion (in a manner to form a point-like boundary when viewed from a plane side). The protruding portion 31m (31n) is formed on a lower side relative to a direction of thickness of the diaphragm 31. The diaphragm 31 is kept in non-contact with the front case 12 in its upper side. Moreover, in the embodiment, as a place where the protruding portion 31 (31n) is to be formed, a place where a time average value of a sound pressure level of a sound wave to be emitted is comparatively small (for example, near 0) and an amplitude of the sound wave is comparatively small (for example, near 0) is selected (for example, a position equivalent to a node point).

As a result, unlike in the case of the conventional technology in which the diaphragm is in contact with the front case in a manner to form a plane-like boundary in a contacted portion in a cross section (in a manner to form a line-like boundary when viewed from its plane side) in an entire portion of the diaphragm relative to a direction of thickness of a side wall face. In the present invention, a region where a side portion of the diaphragm 31 is pressed by the front case 12 is reduced greatly, thus enabling interference with vibration caused by the front case 12 to be suppressed. Therefore, it is possible to reduce adverse effects on acoustic characteristics (degradation of voice quality, decrease in sound volume, or a like) caused by the front case 12. The selection of the region where both the time average value of a sound pressure of a sound wave to be emitted and an amplitude of the sound wave are comparatively small, as the region where the protruding portion 31m (31n) is formed, serves to improve the acoustic characteristics. Moreover, in an outer region of a region corresponding a rectangular display screen of the diaphragm 31 is applied a light-shielding material and the display screen region of the diaphragm 31 overlies a display region of the liquid crystal display panel 41 without being displaced.

The actuator module 32 receives an amplified driving signal through the piezo-electric driving section 8 to be controlled by the controlling section 22 and converts the driving signal being an electric signal into an acoustic signal to vibrate the diaphragm 31. In the embodiment, the actuator module 32 is bonded to a specified portion of a rear of the diaphragm 31 by using, for example, a double-faced adhesive tape. Moreover, on the rear side of the actuator module 32 is placed a cushion material 45 to protect an FPC (Flexible Printed Circuit).

The gasket member 33, as shown in FIG. 6, is bonded to the diaphragm 31 by a double-faced adhesive sheet 37 and to the putting-face 17m of the front case 12 by a double-faced adhesive sheet 38. The double-faced adhesive sheet 37 (38), as shown in FIG. 11, includes a base body 37a (38a) made of PET (polyethylene terephthalate) having an acrylic adhesive layer 37m (38m) formed on one face of the base body 37a (38a) and a silicon adhesive layer 37n (38n) formed on another face of the base body 37a (38a). The diaphragm 31 is attached to the front case 12 with the gasket member 33 interposed between the diaphragm 31 and the front case 12.

The gasket member 33 is made of, for example, silicone rubber and, with the gasket member 33 being bonded to the diaphragm 31, supports the diaphragm 31 while being deformed comparatively easily according to the vibration of the diaphragm 31 at least along a thickness direction and prevents the entry of a foreign matter such as dust or a like into the upper cabinet 6 from the aperture 14. Outer dimensions of the gasket member 33 are set to be somewhat smaller than those of the diaphragm 31. Moreover, the dust preventing cushion component 34 is placed inside of the gasket member 33 (in the embodiment, in clearance space whose side portion is surrounded by an inner wall face 33a of the gasket member 33 and whose upper portion is covered by the diaphragm 31 and, in a lower portion of which the liquid crystal display panel 41 is placed) in a manner to surround a circumferential portion of the display screen region.

In a structure 36 for mounting the flat panel speaker 35, the diaphragm 31 is attached to the actuator module 32 in its specified portion so that vibration is transferred in a manner in which the diaphragm 31 strikes the actuator module 32 to come into physical contact and the protruding portion 31m of the rectangular portion 31a strikes the side wall face 16m of a corresponding corner portion 12a of the side wall 16 of the front case 12 and the protruding portion 31n strikes the side wall face 16n of the corner portion 12a, which enables the diaphragm 31 to be properly positioned and the diaphragm 31 is attached to the front case 12 with the frame-like gasket member 33 made of, for example, silicon rubber interposed between the diaphragm 31 and the front case 12. Here, the gasket member 33 is bonded to the diaphragm 31 by the frame-shaped double-faced adhesive sheet 37 and to the putting-face 17m of the front case 12 by the frame-shaped double-faced adhesive sheet 38. This enables the frame-like portion 33a of the gasket member 33 to support the diaphragm 31 without interference with the vibration of the diaphragm 31 and also enables the prevention of the entry of a foreign matter such as dust or a like into the inside of the upper cabinet 6.

The display section 9 is placed on a side face of the upper cabinet 6 and is made up of, for example, a transmission liquid crystal display device. The liquid crystal display device has the liquid crystal display panel 41, a backlight device (not shown) to supply illuminating light to the liquid crystal display panel 41, a driving circuit (not shown) to drive the liquid crystal display panel 41, and a holding frame 42 to hold the liquid crystal display panel 41, the backlight device, or a like. The liquid crystal display panel 41 is a transmission liquid crystal display panel with a TFT (Thin Film Transistor) structure which has a TFT substrate (not shown) on which a plurality of TFTs (not shown) and transparent pixel electrodes (not shown) are formed, a facing substrate (not shown) fixed, with a clearance of several μm between the TFT substrate and the facing substrate, in a direction opposite to the TFT in which a coloring layer (color filter) (not shown) is formed, a liquid crystal layer (not shown) sealed in the clearance, and a pair of deflectors (not shown) placed outside of the TFT substrate and the facing substrate.

The backlight device has a light source unit (not shown) made up of a plurality of LEDs (Light Emitting Diodes) serving as a point-like light source, a light-guiding plate (not shown) to receive light emitted from the light source unit and to emit plane-shaped illuminating light to the liquid crystal display panel 41, a diffusion sheet (not shown) to correct variations in luminance, an optical component group (not shown) including a prism sheet to gather light entering from a light-guiding side and emits light illuminating light to the liquid crystal display 41 from its rear side to make an observer visually identify light transmission through the liquid crystal display panel 41. On a front side (diaphragm 31 side) of the holding frame 42 is placed an optical component group on which the liquid crystal display panel 41 is fixed, for example, by a frame-shaped double-faced adhesive sheet, with the optical component group sandwiched between the holding frame 42 and the liquid crystal display panel 41.

On the rear side (a rear cover 13 side) of the holding frame 42 is attached a printed circuit board 43 made up of specified circuit patterns formed on an insulating substrate and electronic components installed thereon and the liquid crystal display panel 41 and the light source unit are connected to the printed circuit board 43 via an FPC (not shown). The liquid crystal display panel 41, light source unit, printed circuit board 43, or a like are housed in the upper cabinet 6 with the liquid crystal display panel 41, light source unit, printed circuit board 43, or a like being attached to the holding frame 42 in a manner to be pressed from up-and-down directions by the front case 12 and the rear cover 13 making up the upper-cabinet 6 by using a fixed tool.

The controlling section 22 has a CPU (Central Processing Unit) or a like and executes various processing programs stored in the storing section 23 and controls each component to perform communication control processing, displaying and operating control processing, or a like, by using various registers and flags stored in the storing section 23.

The storing section 23 is made up of semiconductor memories such as a ROM (Read Only Memory), RAM (Random Access Memory), or a like and has a program storing area in which a communication processing program to be run by the controlling section 22, displaying and operating control processing program, browser, mailer or a like are stored and an information storing area in which various kinds of information including setting information for various functions, communication history information, telephone directory, character message information, moving picture file with voice and includes various registers and flags to be used when the controlling section 22 executes programs.

The wireless communicating section 26 is made up of an RF (Rectifier) circuit (not shown), a modulating and demodulating circuit (not shown), a baseband processing circuit (not shown), or a like and modulates a voice or data to transmit the modulated voice or data as wireless waves through the antenna 25 and receives the wireless waves through the antenna 25 to demodulate the received wireless waves to generate a voice or data which is used to carry out telephone conversations or data communication according to specified protocols.

The operating section 27 has a function key group (not shown) including a browser mode selecting key to drive a browser to browse home pages, a determining key to determine operations, a menu key to display an operation menu, an input mode switching key to switch a character inputting mode, a telephone directory key to register and/or search a telephone directory, a conversation start key to carry out a telephone conversation, a clear key to return an operational state back to a previous state by one, a power key to discontinue various operations performed by turning power ON or OFF, a cursor key to move a cursor on a display screen up-and-down and left-and-right directions and a ten-key group to input, for example, numeral characters or a like.

The two-axle hinge 4, as shown in FIGS. 1 and 2, is made up of a base plate 51 attached and fixed to the upper cabinet 6, a rotational shaft 52 supported by the base plate 51 so that the rotational shaft 52 is allowed to rotate freely whose end extrudes in parallel to the display screen of the display section 9 of the upper unit 2, and a rotational shaft 53 placed in a direction perpendicular to the rotational shaft 52 at an end of the rotational shaft 52 which allows the rotational shaft 52 to rotate freely. The upper unit 2 and lower unit 3 are folded by the rotation of the upper cabinet 6 surrounding the rotational shaft 53 relative to the lower cabinet and, while a plane containing a display surface of the upper unit 2 and a plane containing an operational surface of the lower unit 3 intersect each other, the upper unit 2 rotates.

To assemble the portable cellular phone 1 of the embodiment, as shown in FIGS. 1 and 2 and FIG. 14, first, the gasket member 33 is bonded to a circumferential portion of the rear of the diaphragm 31 by using a frame-shaped double-faced adhesive sheet 37 interposed between the diaphragm 31 and the gasket member 33 and a double-faced adhesive sheet 38 is bonded to a side of the gasket member 33 which faces the diaphragm 31. Next, as shown in FIGS. 1 and 2 and FIG. 15, the actuator module 32 is bonded to a specified portion of the rear of the diaphragm 31 by using, for example, a double-faced adhesive tape. Then, as shown in FIGS. 1 and 2, and FIG. 16, the specified rectangular portion 31a (for example, the rectangular portion 31a in the upper left) out of the four rectangular portions 31a of the diaphragm 31 is made to strike a corresponding corner portion of an inner wall face of the side wall 16 of the front case 12 for accurate positioning and the gasket member 33 is bonded to the front case 12 using the double-faced adhesive sheet 38 interposed between the gasket member 33 and the putting-face 17m of the front case 12 so that the diaphragm 31 is attached to the front case 12.

At this time point, the protruding portion 31m of the rectangular portion 31a strikes the side wall face 16m of a corresponding corner portion 12a of the side wall 16 of the front case 12 and the protruding portion 31n strikes the side wall face 16n of the corner portion 12a for positioning of the diaphragm 31 and, with this state being kept, the diaphragm 31 is attached to the front case 12 with the gasket member 33 bonded to the putting-face 17m interposed between the diaphragm 31 and the front case 12. In this state, the protruding portion 31m (31n) is in contact with the side wall face 16m (16n) in a manner to form a line-like boundary in a contacted portion (in a manner to form a point-like boundary when viewed from a plane side). Moreover, with the diaphragm 31 being properly positioned, the display screen region of the diaphragm 31 overlies a display region of the liquid crystal display panel 41 without positional displacement.

Also, as shown in FIGS. 1 and 2, on a front side of the holding frame 42 (on a side to which the diaphragm 31 is attached) is fixed the liquid crystal display panel 41 with the optional component group sandwiched between the holding frame 42 and liquid crystal display panel 41 by using, for example, a frame-shaped double-faced adhesive sheet. Next, as shown in FIGS. 1 and 2, the dust preventing cushion component 34 is attached to the holding frame 42 so as to be placed in the circumferential portion of the liquid crystal display panel 41. Then, the printed circuit board 43 is assembled to be attached, in an overlapped state, to the rear side of the holding frame 42 and an end of the FPC is connected to a connector placed in an end portion of the printed circuit board 43. Next, to the holding frame 42 on which the liquid crystal display panel 41, the light source unit (making up the backlight device), the dust preventing cushion component 34, the printed circuit board 43, or a like is attached the front case 12 from the diaphragm 31 side.

Then, as shown in FIGS. 1 and 2, a component group including the diaphragm 31, actuator module 32, gasket member 33, or a like is mounted on the front case 12 and the actuator module 32 is connected to the printed circuit board 43 by a connector. The portable cellular phone 1 is finally assembled by attaching and fitting the rear cover 13 in or by fastening the rear cover 13 using a fixing tool such as a female screw, male screw, or a like. This causes the diaphragm 31 to strike a specified portion of the actuator module 32 to come into physical contact, thus enabling the transfer of vibration.

In the portable cellular phone 1 assembled as above, in a state in which its the portable cellular phone 1 is opened, for example, when an incoming call arrives, the controlling section 22 controls a ringing-sound making section 29 so that a ringing-sound is generated and also controls the light emitting section 11 so that an LED emits light to make notification of the incoming call. Then, a telephone conversation is started by pressing down the conversation start key of the operating section 27 and a voice from a person with whom the telephone conversation is carried out is output from the voice outputting section (speaker) 7. That is, the controlling section 22 controls the piezo-electric driving section 8 so that an amplified driving signal is fed to the voice outputting section 7. In the voice outputting section 7, the actuator module 32 receives the amplified driving signal and converts the driving signal being an electric signal into an acoustic signal to vibrate the diaphragm 31. A sound wave is directly emitted from the diaphragm 31.

An operator (user) can carry out a telephone conversation without putting the diaphragm 31 on an ear, that is, the operator can hear a receiving voice and makes a voice toward a microphone section 28, with the portable cellular phone 1 being faced toward a front. Here, if an image (moving picture or still picture) is contained in received data, the operator can carry out a conversation while viewing the display screen of the display section 9. Moreover, when a program (moving picture with a voice) downloaded from a site is to be run, an image is displayed on the display section 9 with the cabinets being opened and a voice is emitted from the diaphragm 31 of the voice outputting section 7. When a function of reading out mail is used, a voice is emitted from the diaphragm 31.

A region where a side portion of the diaphragm 31 is pressed by the front case 12 is reduced greatly, thus enabling interference with vibration caused by the front case 12 to be suppressed. Therefore, it is possible to reduce adverse effects on acoustic characteristics (degradation of voice quality, decrease in sound volume, or a like) caused by the front case 12. The selection of the region where the time average value of a sound pressure of a sound wave to be emitted and an amplitude of the sound wave are comparatively small, as the region where the protruding portion 31m (31n) is to be formed, serves to improve the acoustic characteristics. Moreover, since the gasket member 33 is so configured as to support the diaphragm 31 without interfering with the vibration from the diaphragm 31, it made possible for an operator (user) to clearly hear a voice even if the portable cellular phone 1 is put comparatively apart from the operator.

Thus, since a specified rectangular portion 31a out of the four rectangular portions of the diaphragm 31 is made to strike a corresponding corner portion of an inner wall face of the side wall 16 of the front case 12, the diaphragm 31 can be attached to the front case 12 with reliable and accurate positioning performed. Moreover, unlike in the case of the conventional technology in which a diaphragm is in contact with a front case in a manner to form a line-like boundary in a contacted portion when viewed from a plane side at an entire portion of the diaphragm relative to a direction of thickness of a side wall face, in the present invention, the protruding portions 31m and 31n are in contact with the side wall faces 16m and 16n respectively in a manner to form a point-like boundary in a contacted portion when viewed from a plane side and a region where a side portion of the diaphragm 31 is pressed by the front case 12 is reduced greatly and, as a result, interference with vibration caused by the front case 12 can be suppressed. Therefore, it is possible to reduce adverse effects on acoustic characteristics (degradation of voice quality, decrease in sound volume, or a like) caused by the front case 12. Furthermore, as the region where the protruding portion 31m (31n) is to be formed, the region is selected where a time average value of a sound pressure of a sound wave to be emitted and an amplitude of the sound wave are comparatively small, which serves to further improve the acoustic characteristics.

Moreover, since the gasket member 33 is so configured as to support the diaphragm 31 without interfering with the vibration from the diaphragm 31, a voice sound is emitted reliably from the diaphragm 31, thus making it possible for an operator (user) to clearly hear a voice even if the portable cellular phone 1 is put comparatively apart from an operator. Also, unlike in the conventional case where a voice becomes unclear due to displacement of the diaphragm from the position of a voice hole, in the present invention, the operator can hear a receiving voice without putting the diaphragm 31 on an ear, with the portable cellular phone 1 being faced toward the user's front, away from the user, and can hear the receiving voice reliably and clearly and also can carry out a telephone conversation by making a voice toward the sending section 28 even with the ear put apart from the portable cellular phone 1. When an image (moving picture or still picture) is added to data, an operator can hear a voice while seeing a display screen of the display section 9. Furthermore, by employing the flat panel speaker 35, it is made possible to make the portable cellular phone 1 thin and small.

It is apparent that the present invention is not limited to the above embodiments but may be changed and modified without departing from the scope and spirit of the invention. For example, in the above embodiment, the case in which the diaphragm also serves as the screen component is described, however, the diaphragm may be used exclusively without serving as another component. In this case, it is not necessary that the diaphragm is transparent. Moreover, the shape of the diaphragm is not limited to a rectangle when viewed from a plane side. The diaphragm may of a polygonal shape, of a circular shape, of an elliptical shape, or of an indefinite shape, when viewed from a plane side. Also, the cabinet may be made of metal or a resin.

Figure 17:
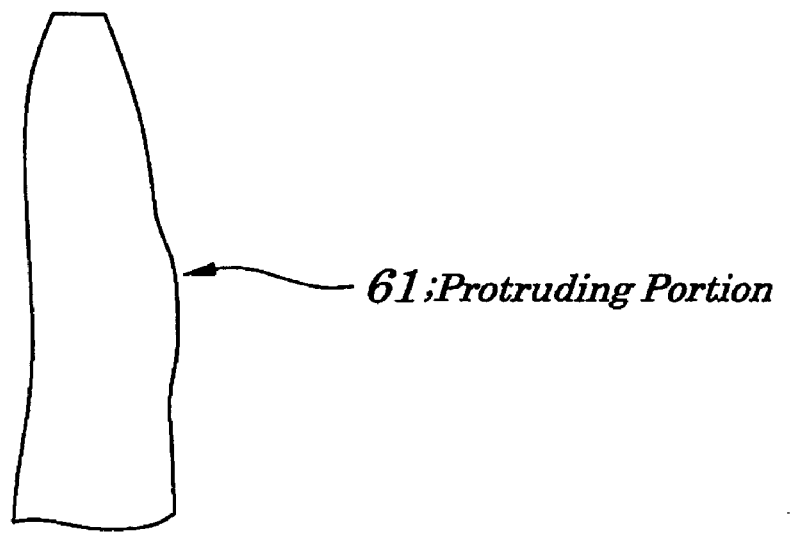
FIG. 17 is a cross-sectional view showing a configuration of a protruding portion of a diaphragm of a portable cellular phone according to a modified embodiment of the present invention.
Figure 18:
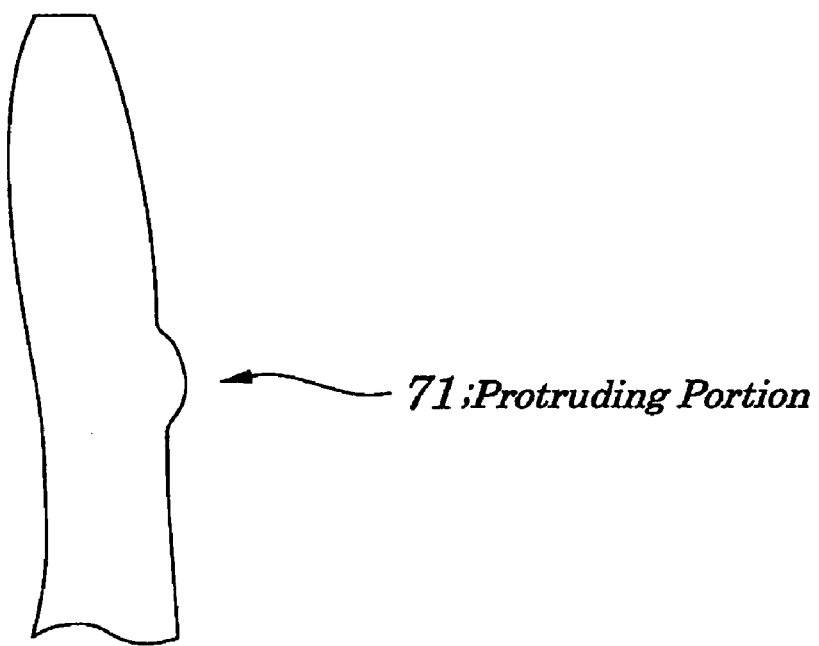
FIG. 18 is a cross-sectional view showing a configuration of a protruding portion of a diaphragm of a portable cellular phone according to another modified embodiment of the present invention.
Figure 19:
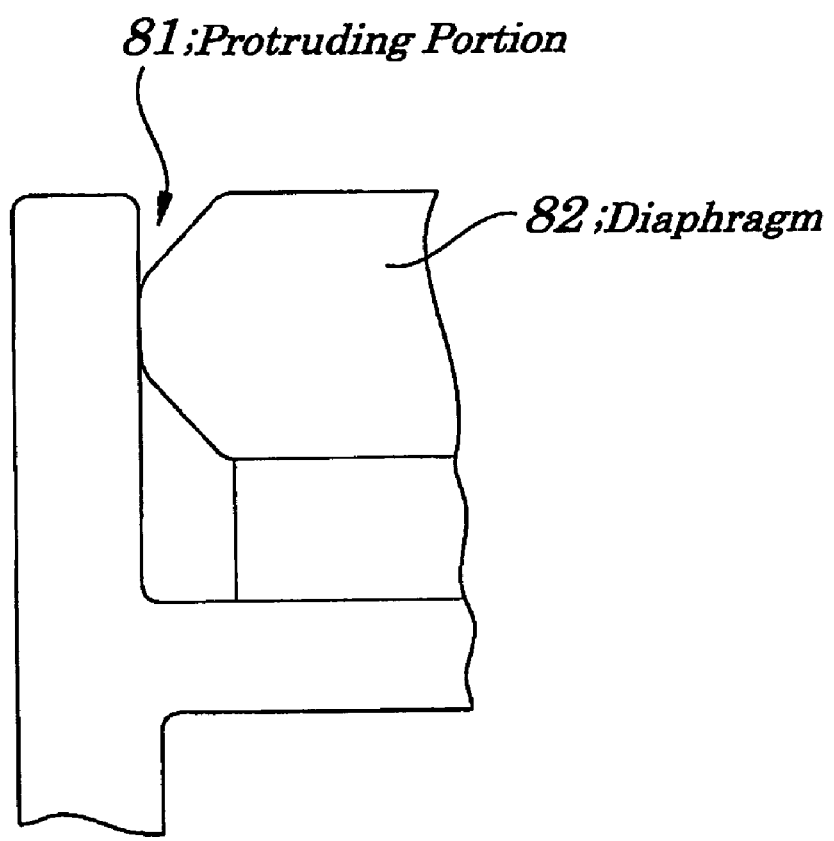
FIG. 19 is a cross-sectional view showing a state in which a diaphragm is attached to a cabinet, with the diaphragm being positioned, of a portable cellular phone according to still another modified embodiment of the present invention.
Figure 20:
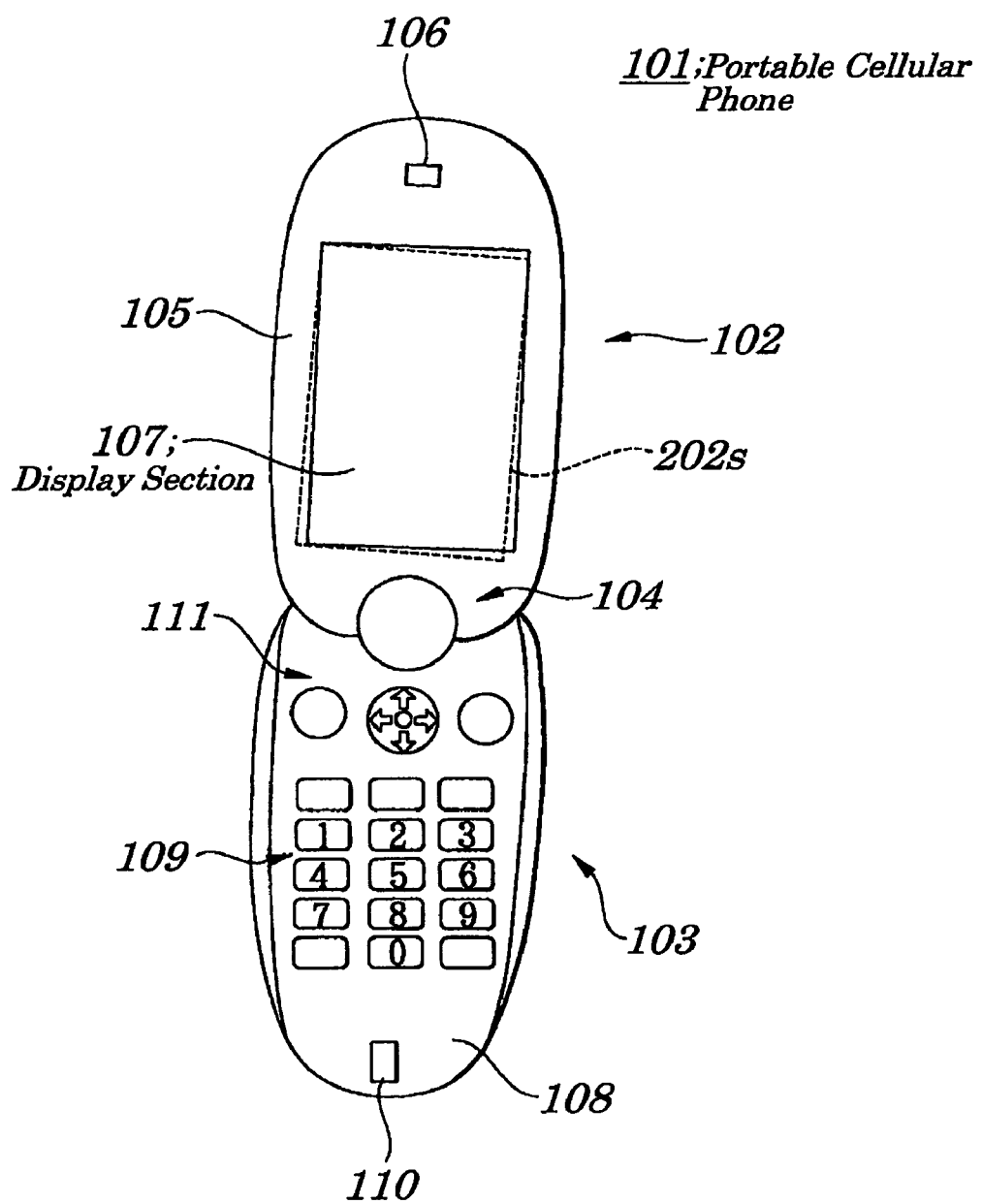
FIG. 20 is a diagram explaining a conventional portable cellular phone technology.
Figure 21:
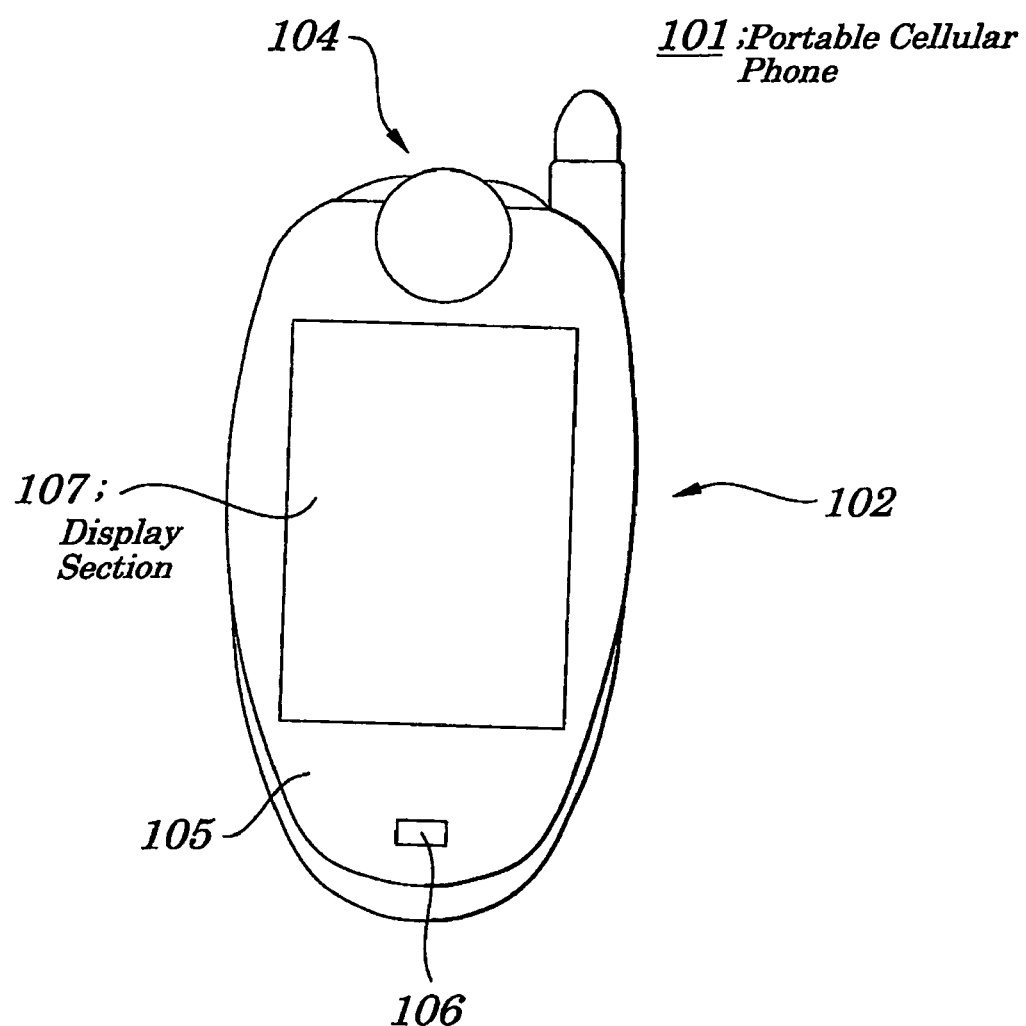
FIG. 21 is also a diagram explaining the conventional portable cellular phone technology.
Figure 22:
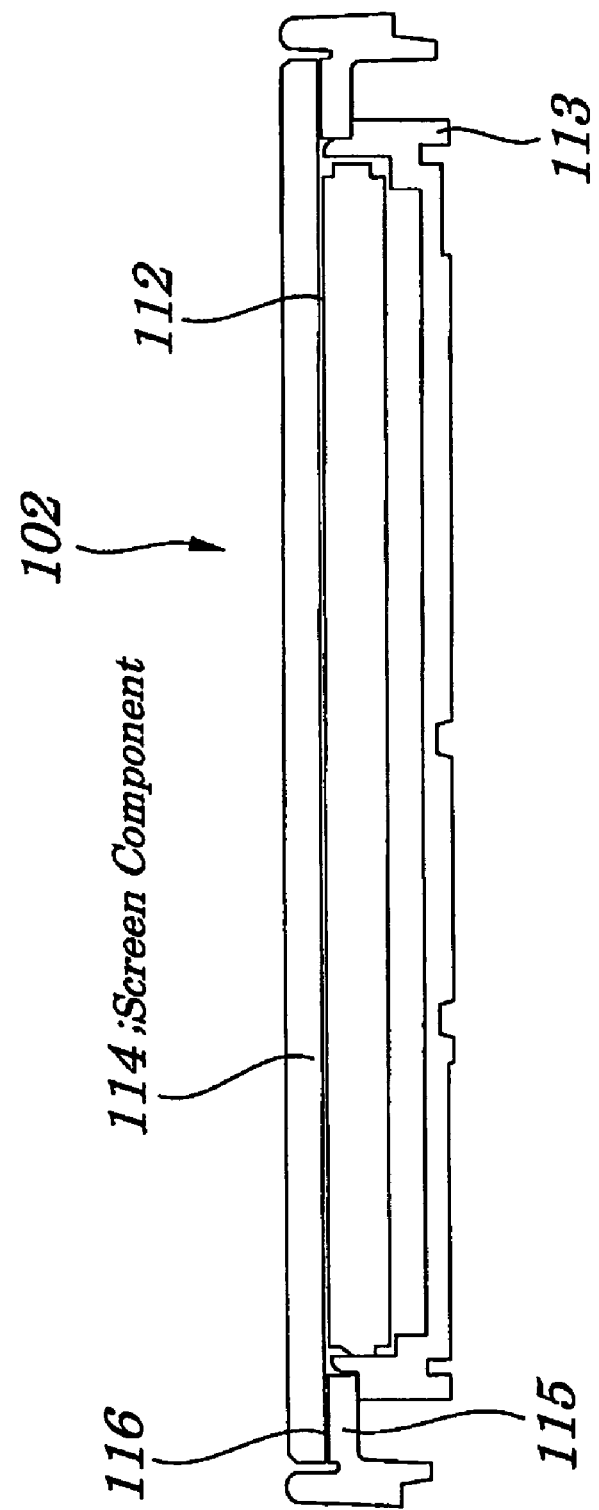
FIG. 22 is also a diagram explaining the conventional portable cellular phone technology.
Figure 23:
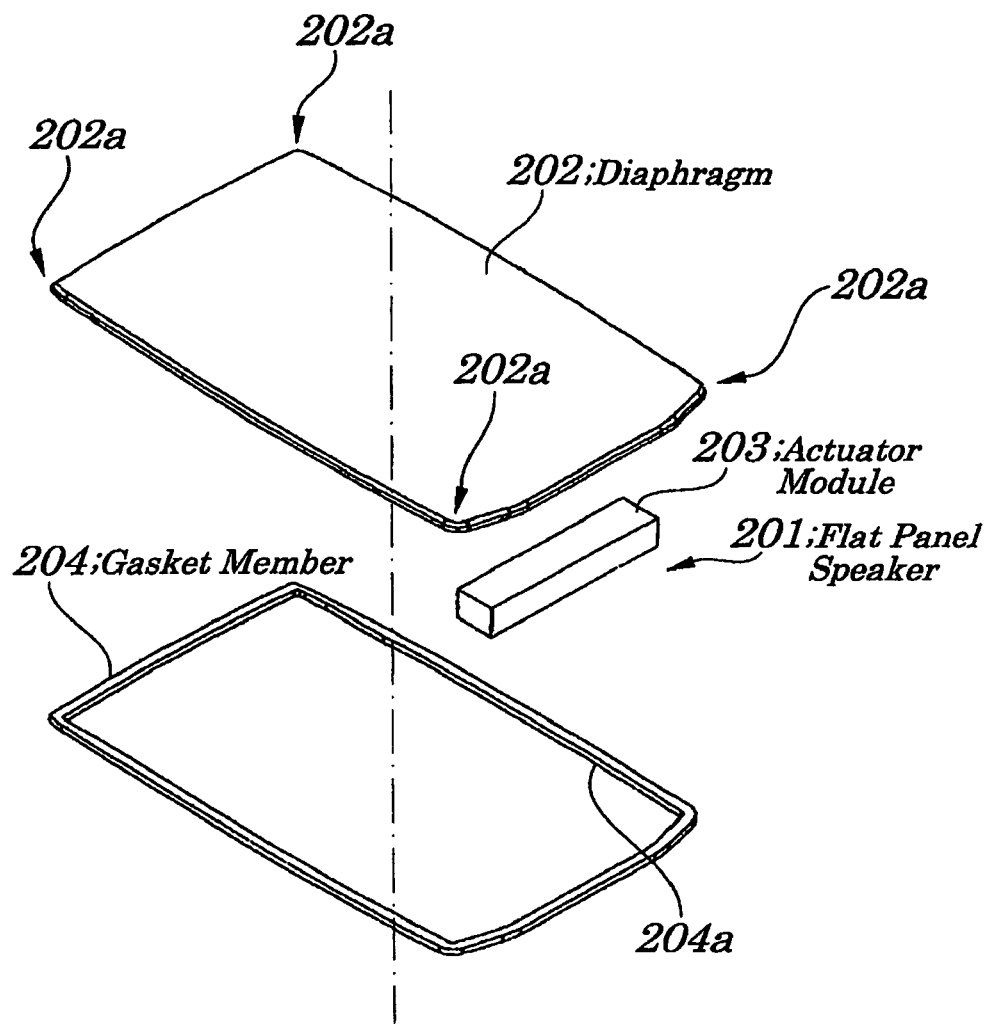
FIG. 23 is also a diagram explaining the conventional portable cellular phone technology.
Figure 24:
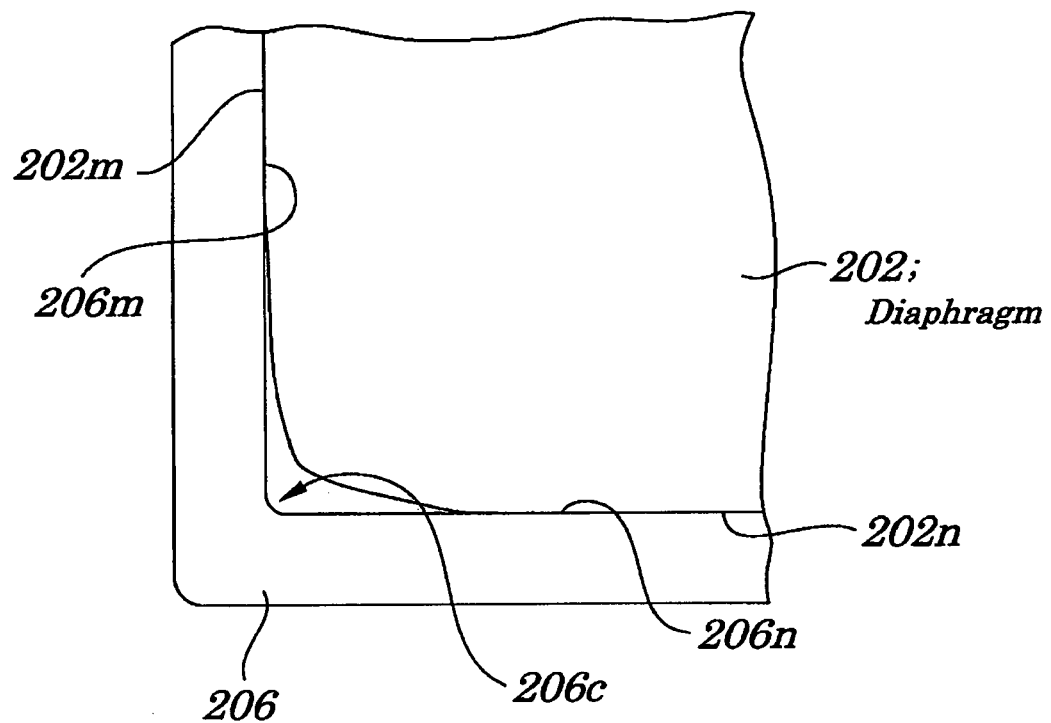
FIG. 24 is also a diagram explaining the conventional portable cellular phone technology.
Figure 25:
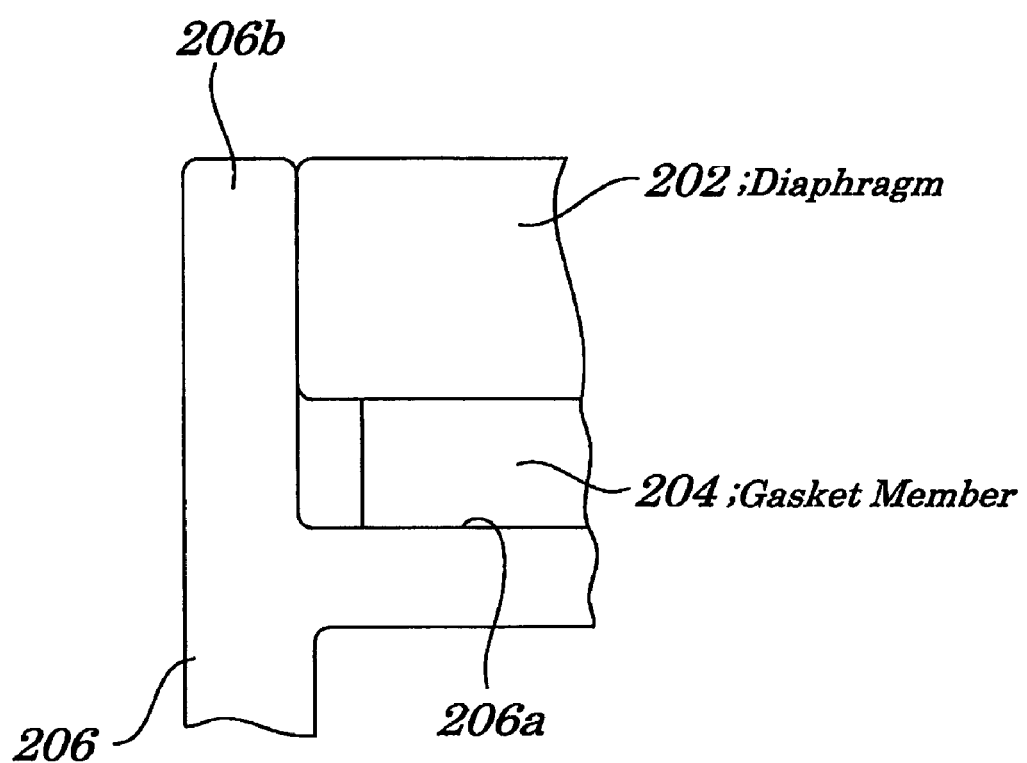
FIG. 25 is also a diagram explaining the conventional portable cellular phone technology.

The protruding portion for positioning may be formed on the cabinet side. Moreover, a curvature of a contour (being circular-arc shaped in its cross section) of the protruding portion may be set at any value and, as shown in FIG. 17, the protruding portion 61 may be formed so that the curvature of its contour (being circular-arc shaped in its cross section) is comparatively small. Also, as shown in FIG. 18, the protruding portion 71 may be formed so that the curvature of its contour (being circular-arc shaped in its cross section) is comparatively large. The shape of the contour, in its cross section, of the protruding portion is not limited to the circular arc and the contour may be of an arbitrary curved-line shape. As shown in FIG. 19, the protruding portion 81 may be formed at a central portion in a direction of thickness of the diaphragm 82. Here, a position in which a portion to be contacted by the protruding portion and diaphragm is formed is not limited to a central place of the diaphragm and may be formed either in an upper or lower portion. A length in a direction of thickness of the portion to be contacted by the protruding portion and the diaphragm may be changed whenever necessary.

Also, it is not necessary that the protruding portions are formed at the four rectangular corners and the protruding portions may be formed in at least one place (for example, in a place being most apart from the actuator module 32). Thus, by reducing the number of contacted places to a minimum limit and by selecting a portion being most apart from the actuator module 32, acoustic characteristics can be improved further. Furthermore, in the above embodiment, the voice outputting section 7 is mounted at one place, however, may be placed at two or more places. In this case, the voice outputting section 7 may be placed on any one of the upper and lower units.

Also, by adding an electronic camera unit, the portable cellular phone 1 may have a photographing function or video phone function. In this case, the voice outputting section 7 may produce a pseudo shutter sound at time of photographing. The portable cellular phone 1 of the present invention may be so configured that, when receiving a signal, an incoming call is output from the voice outputting section 7 with amounts of a sound calibrated. The diaphragm may be bonded directly to the gasket member by using not the double-faced adhesive but an adhesive layer or may be bonded by using a thermal welding method.

The gasket member may be attached to the front case by using methods other than the adhesion method. In the above embodiment, the case in which the rotational shaft 52 is placed in a direction parallel to a main face of the upper cabinet 6 is described, however, the rotational shaft 52 may be placed in a direction perpendicular to the main face of the upper cabinet 6. In this case, the upper unit 2 rotates in a state in which a display face of the upper unit 2 is approximately in parallel to an operating face of the lower unit 3. The present invention also may be applied not only to the two-axle type foldable portable cellular phone but also to a foldable portable cellular phone that can be simply opened or closed and to a straight-type portable cellular phone other than the foldable-type one.

The present invention can be applied not only to a portable cellular phone but also to a portable electronic device such as a PHS (Personal Handy-phone System), PDA (Personal Digital Assistants), and portable computer. Also, the present invention can be applied not only to a portable electronic device but also to an acoustic device or computer having a flat panel speaker.

What is claimed is:

1. A structure for mounting a flat panel speaker in an electronic device in which said flat panel speaker to emit sound waves by vibrating a diaphragm is attached to a cabinet of said electronic device, said structure comprising:

said diaphragm having an outer perimeter;

said outer perimeter having protruding portions and non-protruding portions;

said protruding portions contacting said cabinet; and said non-protruding portions making up a majority of said outer perimeter and not contacting said cabinet said protruding portions including at least one first protruding portion and at least one second protruding portion;

said first protruding portion and said second protruding portion contacting said cabinet at a first contacted portion and a second contacted portion respectively;

said diaphragm being placed on a putting-face of said cabinet; and said diaphragm being positioned relative to said cabinet in a first direction and in a second direction, said both directions intersecting each other and being approximately parallel to said putting-face of said cabinet;

said first protruding portion is formed in one of two side wall portions making up specified rectangular portions formed in said diaphragm and said second protruding portion is formed in another of said two side wall portions and wherein concave portions are formed on said cabinet and said first contacted portion is formed in one of two inner wall portions making up specified corner portions formed in said concave portions and said second contacted portion is formed in another of said two inner wall portions making up said specified corner portions formed in said concave portions wherein, by contacting said first protruding portion against said first contacted portion, said diaphragm is positioned relative to said cabinet in said first direction and, by contacting said second protruding portion against said second contacted portion, said diaphragm is positioned relative to said cabinet in said second direction.

2. The structure for mounting the flat panel speaker in the electronic device according to claim 1, wherein, in a specified portion on a rear of said diaphragm, an actuator to vibrate said diaphragm is placed and said first protruding portion and said second protruding portion are formed in a portion located by a specified distance or more apart from a portion where said actuator is placed.

3. The structure for mounting the flat panel speaker in the electronic device according to claim 1, wherein said first protruding portion and said second protruding portion are formed in a portion where a time average value of a sound pressure of a sound wave to be emitted and an amplitude of said sound wave are comparatively small.

4. The structure for mounting the flat panel speaker in the electronic device according to claim 1, wherein each of said first and second protruding portions is configured so that its contour in a cross section is formed by a smooth curve with an outward convex shape and each of said first and second protruding portion is in contact with said first and second contacted portion in a manner to form a point-like boundary in a contacted portion when viewed from a plane side.

5. The structure for mounting the flat panel speaker in the electronic device according to claim 1, wherein said diaphragm comprises a plate-like component being symmetric with respect to a line on a specified symmetric axis and said first direction is parallel to or perpendicular to said symmetric axis and said second direction intersects said first direction at right angles.

6. The structure for mounting the flat panel speaker in the electronic device according to claim 1, wherein said diaphragm is put on said putting-face of said cabinet with a supporting member bonded to a rear of said diaphragm and used to support said diaphragm being interposed between said diaphragm and said cabinet.

7. The structure for mounting the flat panel speaker in the electronic device according to claim 1, wherein an aperture is formed at a bottom of said concave portion of said cabinet and said putting-face makes up an edge of said aperture and said diaphragm covers said aperture.

8. The structure for mounting the flat panel speaker in the electronic device according to claim 7, wherein said supporting member comprises a flat and frame-shaped component and is placed so that an inner wall face of said flat and frame-shaped component surrounds said aperture and has a foreign-matter entry preventing function of preventing entry of a foreign matter including dust from said aperture into said cabinet.

9. The structure for mounting the flat panel speaker in the electronic device according to claim 6, wherein said supporting member, with being bonded to said diaphragm, supports said diaphragm while being deformed along at least a thickness direction according to vibration of said diaphragm.

10. The structure for mounting the flat panel speaker in the electronic device according to claim 2, wherein an actuator has a piezo-electric element and is in contact with a specified portion of said diaphragm.

11. The structure for mounting the flat panel speaker in the electronic device according to claim 7, wherein said electric device has a display unit to display character information or image information and said diaphragm is made of a transparent material and also serves as a screen component to protect a display screen of said display unit.

12. A diaphragm attached to a cabinet of an electronic device and making up a flat panel speaker for emitting sound waves by being vibrated, said diaphragm comprising:

an outer perimeter;

said outer perimeter having protruding portions and non-protruding portions;

said protruding portions contacting said cabinet when said flat panel speaker is mounted on said cabinet; and said non-protruding portions making up a majority of said outer perimeter and not contacting said cabinet when said flat panel speaker is mounted on said cabinet said protruding portions including at least one first protruding portion and at least one second protruding portion;

wherein said diaphragm is to be placed on a putting-face of said cabinet, wherein said diaphragm is to be positioned relative to said cabinet in a first direction and in a second direction, said both directions intersecting each other and being approximately parallel to said putting-face of said cabinet, and wherein said diaphragm is attached to said cabinet in which concave portions are formed and said first contacted portion is formed in one of two inner wall portions making up specified corner portions formed in said concave portions and said second contacted portion is formed in another of said two inner wall portions making up said specified corner portions formed in said concave portions and in which said first protruding portion is formed in one of two side wall portions making up specified rectangular portions and said second protruding portion is formed in another of said two side wall portions wherein, by contacting said first protruding portion against a first contacted portion formed in said cabinet, said diaphragm is positioned relative to said cabinet in said first direction and, by contacting said second protruding portion against a second contacted portion formed in said cabinet, said diaphragm is positioned relative to said cabinet in said second direction.

13. The diaphragm according to claim 12, wherein, in a specified portion on a rear of said diaphragm, an actuator to vibrate said diaphragm is placed and said first protruding portion and said second protruding portion are formed in a portion located by a specified distance or more apart from a portion where said actuator is placed.

14. The diaphragm according to claim 12, wherein said first protruding portion and said second protruding portion are formed in a portion where a time average value of a sound pressure of a sound wave to be emitted and an amplitude of said sound wave are comparatively small.

15. The diaphragm according to claim 12, wherein each of said first and second protruding portions is constructed so that its contour in a cross section is formed by a smooth curve with an outward convex shape and each of said first and second protruding portion is in contact with said first and second contacted portion in a manner to form a point-like boundary in a contacted portion when viewed from a plane side.

16. The diaphragm according to claim 12, wherein said diaphragm comprises a plate-like component being symmetric with respect to a line on a specified symmetric axis and said first direction is parallel to or perpendicular to said symmetric axis and said second direction intersects said first direction at right angles.

17. The diaphragm according to claim 12, wherein a supporting member to support said diaphragm is bonded to a rear of said diaphragm and wherein said diaphragm is placed on said putting-face of said cabinet with said supporting member being interposed between said diaphragm and said cabinet.

18. The diaphragm according to claim 12, wherein said diaphragm is attached to said cabinet having an aperture formed at a bottom of said concave portions and a putting-face making up an edge of said aperture, in a manner to cover said aperture.

19. The diaphragm according to claim 18, wherein said supporting member comprises a flat and frame-shaped component and is placed so that its inner wall face surrounds said aperture and has a foreign-matter entry preventing function of preventing entry of a foreign matter including dust from said aperture into said cabinet.

20. The diaphragm according to claim 17, wherein said supporting member, with being bonded to said diaphragm, supports said diaphragm while being deformed along at least a thickness direction according to vibration of said diaphragm.

21. The diaphragm according to claim 18, wherein said electric device has a display unit to display character information or image information and said diaphragm is made of a transparent material and also serves as a screen component to protect a display screen of said display unit.

22. A flat panel speaker mounted on a cabinet of an electronic device for emitting sound waves by vibrating a diaphragm, comprising:

said diaphragm having an outer perimeter;

said outer perimeter having protruding portions and non-protruding portions;

said protruding portions contacting said cabinet when said flat panel speaker is mounted on said cabinet; and said non-protruding portions making up a majority of said outer perimeter and not contacting said cabinet when said flat panel speaker is mounted on said cabinet said protruding portions including at least one first protruding portion and at least one second protruding portion;

wherein said diaphragm is to be placed on a putting-face of said cabinet, wherein said diaphragm is to be positioned relative to said cabinet in a first direction and in a second direction, said both directions intersecting each other and being approximately parallel to said putting-face of said cabinet, and wherein said flat panel speaker is attached to said cabinet in which concave portions are formed and said first contacted portion is formed in one of two inner wall portions making up specified corner portions formed in said concave portions and said second contacted portion is formed in another of said two inner wall portions making up said specified corner portions formed in said concave portions and in which said first protruding portion is formed in one of two side wall portions making up specified rectangular portions and said second protruding portion is formed in another of said two side wall portions wherein, by contacting said first protruding portion against a first contacted portion formed in said cabinet, said diaphragm is positioned relative to said cabinet in said first direction and, by contacting said second protruding portion against a second contacted portion formed in said cabinet, said diaphragm is positioned relative to said cabinet in said second direction.

23. The flat panel speaker according to claim 22, wherein, in a specified portion on a rear of said diaphragm, an actuator to vibrate said diaphragm is placed and said first protruding portion and said second protruding portion are formed in a portion located by a specified distance or more apart from a portion where said actuator is placed.

24. The flat panel speaker according to claim 22, wherein said first protruding portion and said second protruding portion are formed in a portion where a time average value of a sound pressure of a sound wave to be emitted and an amplitude of said sound wave are comparatively small.

25. The flat panel speaker according to claim 22, wherein each of said first and second protruding portions is constructed so that its contour in a cross section is formed by a smooth curve with an outward convex shape and each of said first and second protruding portion is in contact with said first and second contacted portion in a manner to form a point-like boundary in a contacted portion when viewed from a plane side.

26. The flat panel speaker according to claim 22, wherein said diaphragm comprises a plate-like component being symmetric with respect to a line on a specified symmetric axis and said first direction is parallel to or perpendicular to said symmetric axis and said second direction intersects said first direction at right angles.

27. The flat panel speaker according to claim 22, wherein said diaphragm is placed on said putting-face of said cabinet with said supporting member bonded to a rear of said diaphragm and used to support said diaphragm being interposed between said diaphragm and said cabinet.

28. The flat panel speaker according to claim 22, wherein said diaphragm is attached to said cabinet having an aperture formed at a bottom of said concave portions and a putting-face making up an edge of said aperture, in a manner to cover said aperture.

29. The flat panel speaker according to claim 28, wherein said supporting member comprises a flat and frame-shaped component and is placed so that its inner wall face surrounds said aperture and has a foreign-matter entry preventing function of preventing entry of a foreign matter including dust from said aperture into said cabinet.

30. The flat panel speaker according to claim 27, wherein said supporting member, with being bonded to said diaphragm, supports said diaphragm while being deformed along at least a thickness direction according to vibration of said diaphragm.

31. The flat panel speaker according to claim 23, wherein said actuator has a piezo-electric element and is in contact with a specified portion of said diaphragm.

32. The flat panel speaker according to claim 28, wherein said electric device has a display unit to display character information or image information and said diaphragm is made of a transparent material and also serves as a screen component to protect a display screen of said display unit.

33. An electronic device having the structure for mounting the flat panel speaker in the electronic device stated in claim 1.

34. A method for mounting a flat panel speaker in an electronic device in which said flat panel speaker to emit sound waves by vibrating a diaphragm is attached to a cabinet of said electronic device, said method comprising:
a step of preparing said diaphragm, an outer perimeter of which is formed to have protruding portions and non-protruding portions, said non-protruding portions making up a majority of said outer perimeter;
a step of providing said cabinet; and
a step of mounting said speaker to said electronic device so that said protruding portions contacting said cabinet, and said non-protruding portions do not contact said cabinet
wherein said protruding portions include at least one first protruding portion and at least one second protruding portion,
wherein said cabinet includes a putting-face which said diaphragm is to be placed on,
wherein said cabinet includes at least one first contacted portion and at least one second contacted portion which are to be contacted by said first protruding portion and said second protruding portion respectively,
wherein said mounting step further includes:
a step of positioning said diaphragm relative to said cabinet in a first direction, out of first and second directions which both intersect each other and are approximately parallel to said putting-face of said cabinet, by contacting said first protruding portion against said first contacted portion; and
a step of positioning said diaphragm relative to said cabinet in said second direction by contacting said second protruding portion against said second contacted portion
wherein said first protruding portion is formed in one of the two side wall portions making up specified rectangular portions formed in said diaphragm and said second protruding portion is formed in another of said two side wall portions and wherein concave portions are formed on said cabinet and said first contacted portion is formed in one of two inner wall portions making up specified corner portions formed in said concave portions and said second contacted portion is formed in another of said two inner wall portions making up said specified corner portions formed in said concave portions.

35. The method for mounting the flat panel speaker in the electronic device according to claim 34, wherein, in a specified portion on a rear of said diaphragm, an actuator to vibrate said diaphragm is placed and said first protruding portion and said second protruding portion are formed in a portion located by a specified distance or more apart from a portion where said actuator is placed.

36. The method for mounting the flat panel speaker in the electronic device according to claim 34, wherein said first protruding portion and said second protruding portion are formed in a portion where a time average value of a sound pressure of a sound wave to be emitted and an amplitude of said sound wave are comparatively small.

37. The method for mounting the flat panel speaker in the electronic device according to claim 34, wherein each of said first and second protruding portions is constructed so that its contour in a cross section is formed by a smooth curve with an outward convex shape and each of said first and second protruding portion is in contact with said first and second contacted portion in a manner to form a point-like boundary in a contacted portion when viewed from a plane side.

38. The method for mounting the flat panel speaker in the electronic device according to claim 34, wherein said diaphragm comprises a plate-like component being symmetric with respect to a line on a specified symmetric axis and said first direction is parallel to or perpendicular to said symmetric axis and said second direction intersects said first direction at right angles.

39. The method for mounting the flat panel speaker in the electronic device according to claim 34, wherein said diaphragm is placed on said putting-face of said cabinet with said supporting member bonded to a rear of said diaphragm and used to support said diaphragm being interposed between said diaphragm and said cabinet.

40. The method for mounting the flat panel speaker in the electronic device according to claim 34, wherein an aperture is formed at a bottom of said concave portion of said cabinet and said putting-face makes up an edge of said aperture and said diaphragm covers said aperture.

41. The method for mounting the flat panel speaker in the electronic device according to claim 40, wherein said supporting member comprises a flat and frame-shaped component and is placed so that its inner wall face surrounds said aperture so as to prevent entry of a foreign matter including dust from said aperture into said cabinet.

42. The method for mounting the flat panel speaker in the electronic device according to claim 39, wherein said supporting member, with being bonded to said diaphragm, supports said diaphragm while being deformed along at least a thickness direction according to vibration of said diaphragm.

43. The method for mounting the flat panel speaker in the electronic device according to claim 35, wherein said actuator has a piezo-electric element and is in contact with a specified portion of said diaphragm.

44. A diaphragm to be attached to a cabinet of an electronic device and making up a flat panel speaker for emitting sound waves by being vibrated, said diaphragm comprising:
an outer perimeter having four sections of equal length;
each of said four sections having at least two protrusions;
said outer perimeter also having non-protruding portions,
wherein each of said protrusions are made to contact said cabinet when said flat panel speaker is mounted on said cabinet, and wherein said non-protruding portions are made to not contact said cabinet when said flat panel speaker is mounted on said cabinet, said protruding portions including at least one first protruding portion and at least one second protruding portion;

wherein said diaphragm is to be placed on a putting-face of said cabinet, wherein said diaphragm is to be positioned relative to said cabinet in a first direction and in a second direction, said both directions intersecting each other and being approximately parallel to said putting-face of said cabinet, and, by contacting said first protruding portion against a first contacted portion formed in said cabinet, said diaphragm is positioned relative to said cabinet in said first direction, and, by contacting said second protruding portion against a second contacted portion formed in said cabinet, said diaphragm is positioned relative to said cabinet in said second direction, wherein said diaphragm is attached to said cabinet in which concave portions are formed and said first contacted portion is formed in one of two inner wall portions making up specified corner portions formed in said concave portions and said second contacted portion is formed in another of said two inner wall portions making up said specified corner portions formed in said concave portions and in which said first protruding portion is formed in one of two side wall portions making up specified rectangular portions and said second protruding portion is formed in another of said two side wall portions.

45. A diaphragm according to claim 44 further comprising:

each of said sections having a corner;

side walls connecting each of said corners with another of said corners, and each of said side walls having a midpoint;

each of said protrusions being formed on one of said sidewalls; and each of said protrusions being formed closer to one of said corners than said midpoint of said side wall on which said protrusion is formed.

* * * * *